US012485980B2

(12) United States Patent
VanDenberg et al.

(10) Patent No.: US 12,485,980 B2
(45) Date of Patent: Dec. 2, 2025

(54) METHOD OF INSTALLING INTEGRATED LIFT AXLE SUSPENSION SYSTEM

(71) Applicant: Transportation Technologies, Inc., Massillon, OH (US)

(72) Inventors: Ervin K. VanDenberg, Massillon, OH (US); Lyle Edward Turkson, Canton, OH (US); David H. Croston, Navarre, OH (US)

(73) Assignee: TRANSPORTATION TECHNOLOGIES, INC., Massillon, OH (US)

( * ) Notice: Subject to any disclaimer, the term of this patent is extended or adjusted under 35 U.S.C. 154(b) by 47 days.

(21) Appl. No.: 18/606,852

(22) Filed: Mar. 15, 2024

(65) Prior Publication Data
US 2025/0289522 A1 Sep. 18, 2025

(51) Int. Cl.
B62D 61/12 (2006.01)
B60G 7/02 (2006.01)
B60G 11/27 (2006.01)
B60G 11/28 (2006.01)

(52) U.S. Cl.
CPC .............. B62D 61/125 (2013.01); B60G 7/02 (2013.01); B60G 11/27 (2013.01); B60G 11/28 (2013.01); B60G 2200/132 (2013.01); B60G 2202/1524 (2013.01); B60G 2204/1432 (2013.01); B60G 2204/15 (2013.01); B60G 2300/04 (2013.01)

(58) Field of Classification Search
CPC ........ B62D 61/125; B60G 7/02; B60G 11/28; B60G 2200/132; B60G 2202/1524; B60G 2204/15; B60G 2300/04
See application file for complete search history.

(56) References Cited

U.S. PATENT DOCUMENTS

| 3,078,104 | A | | 2/1963 | Chalmers | |
|---|---|---|---|---|---|
| 4,261,597 | A | * | 4/1981 | Vandenberg | B62D 17/00 280/86.75 |
| 5,090,495 | A | | 2/1992 | Christenson | |
| 5,403,031 | A | | 4/1995 | Gottschalk | |
| 5,540,454 | A | * | 7/1996 | VanDenberg | B62D 61/12 180/209 |
| 5,549,322 | A | | 8/1996 | Hauri | |
| 5,597,174 | A | * | 1/1997 | Christenson | B60G 5/04 180/209 |
| 6,073,946 | A | | 6/2000 | Richardson | |

(Continued)

FOREIGN PATENT DOCUMENTS

CA 2410776 A1 5/2004

Primary Examiner — Paul N Dickson
Assistant Examiner — Tiffany L Webb
(74) Attorney, Agent, or Firm — Sand, Sebolt & Wernow Co., LPA

(57) ABSTRACT

A suspension assembly and method of use is provided. The suspension is for an axle on a trailer or other vehicle. The suspension assembly has a cross support member connected with or integrally formed with a hanger bracket at the first end of the cross support member. A trailing beam is connected to the hanger bracket. The trailing beam and a mount are coupled with a load air bag and a lift air bag, with the bags located on each respective side of a pivot axis for the trailing beam. This establishes a teeter-totter configuration of the suspension assembly allowing independent wheel travel side-to-side of the suspension assembly.

14 Claims, 12 Drawing Sheets

(56) References Cited

U.S. PATENT DOCUMENTS

| | | | |
|---|---|---|---|
| 6,471,223 B1 | 10/2002 | Richardson | |
| 6,871,862 B2 | 3/2005 | Chalin | |
| 7,434,821 B2 | 10/2008 | Hinz | |
| 8,322,734 B2 | 12/2012 | Yao | |
| 9,352,628 B2 | 5/2016 | Barton | |
| 10,960,946 B2 * | 3/2021 | Smith | B60G 17/016 |
| 11,220,304 B1 | 1/2022 | Bailey | |
| 11,225,287 B1 | 1/2022 | Schuck | |
| 11,712,938 B1 | 8/2023 | Klein | |
| 12,214,639 B1 * | 2/2025 | VanDenberg | B60G 11/27 |
| 12,227,046 B1 * | 2/2025 | VanDenberg | B62D 61/12 |
| 2012/0126504 A1 | 5/2012 | Piehl | |
| 2022/0371391 A1 | 11/2022 | Tapscott | |
| 2024/0174040 A1 | 5/2024 | Dudding | |

* cited by examiner

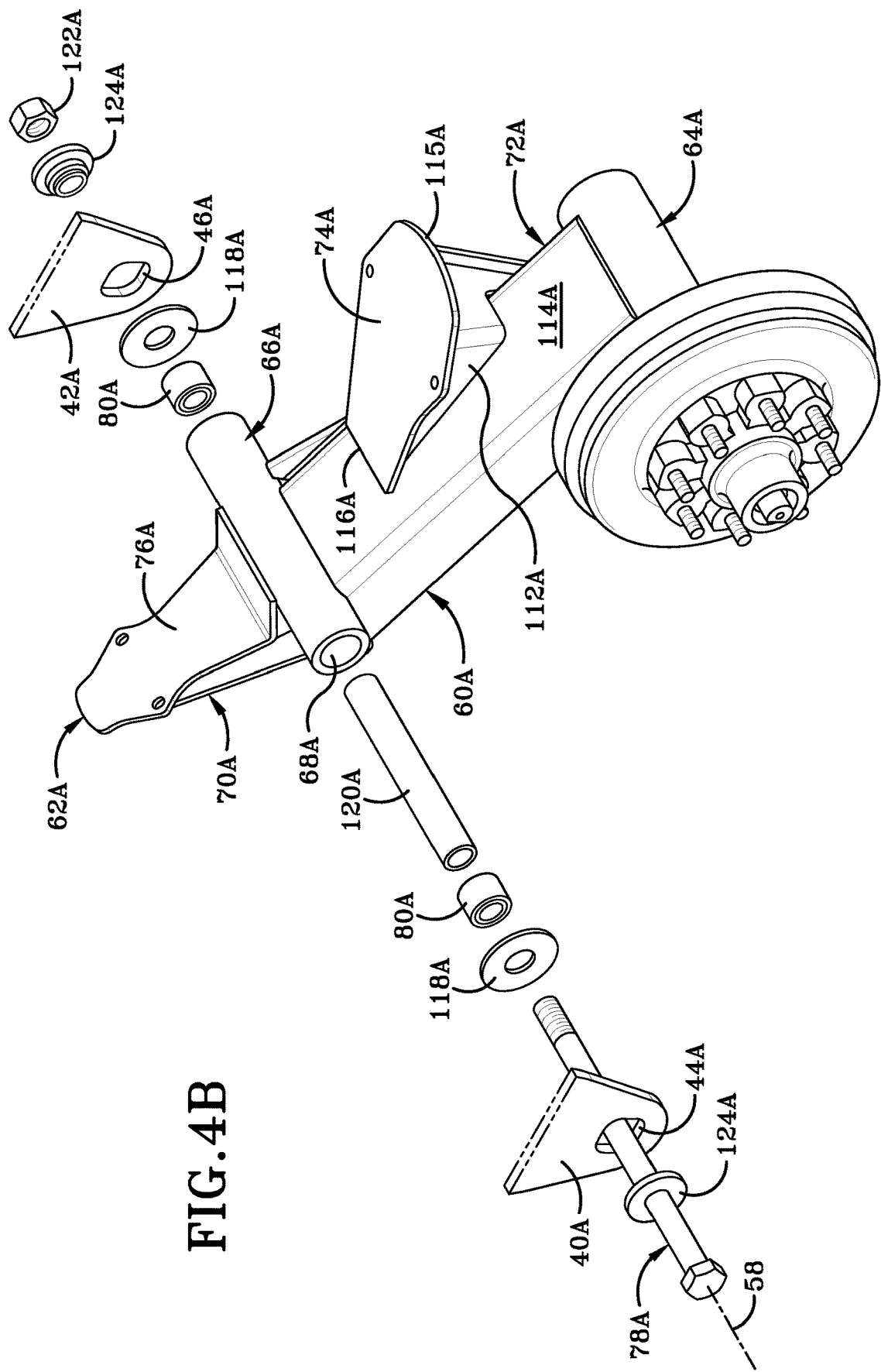

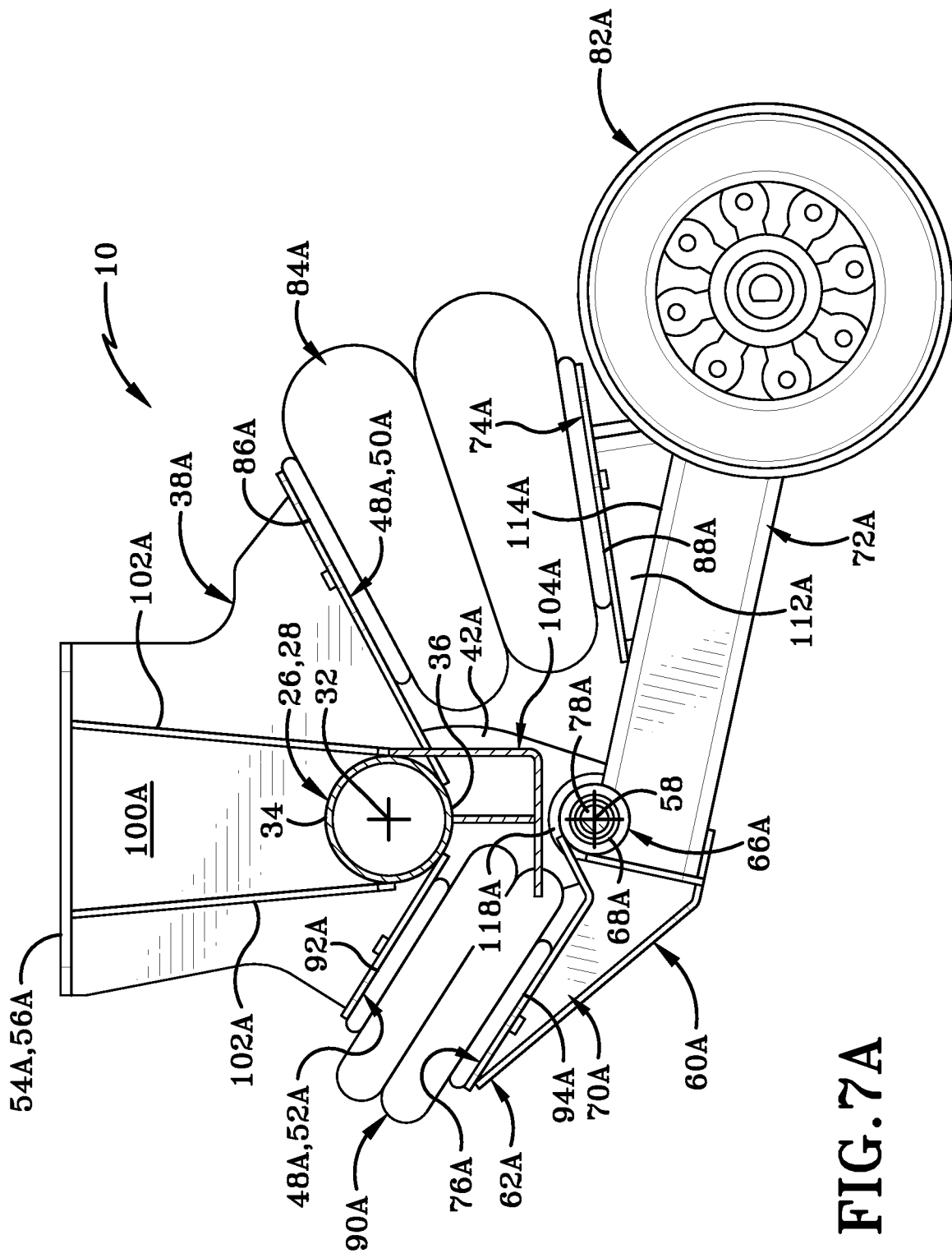

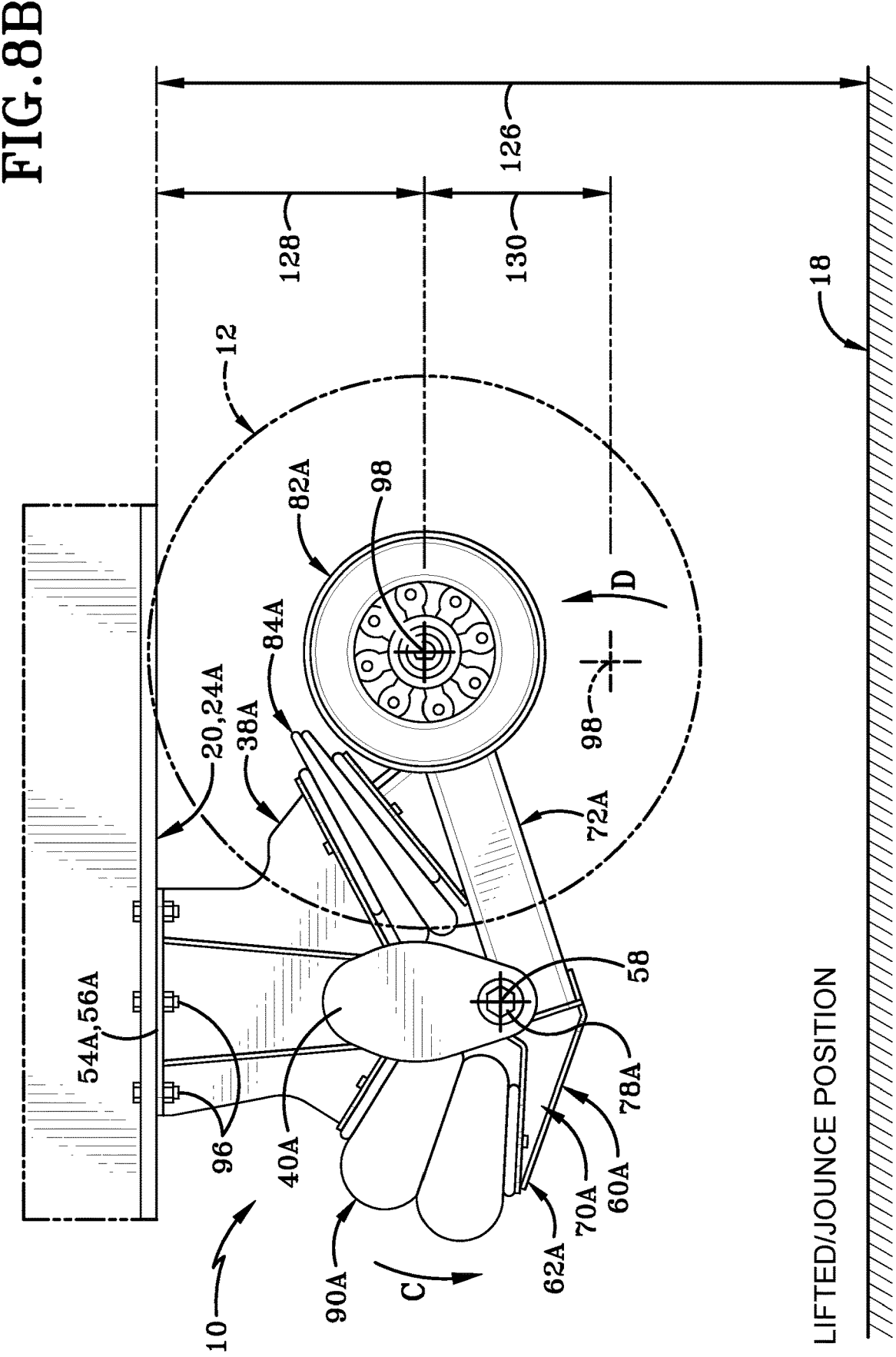

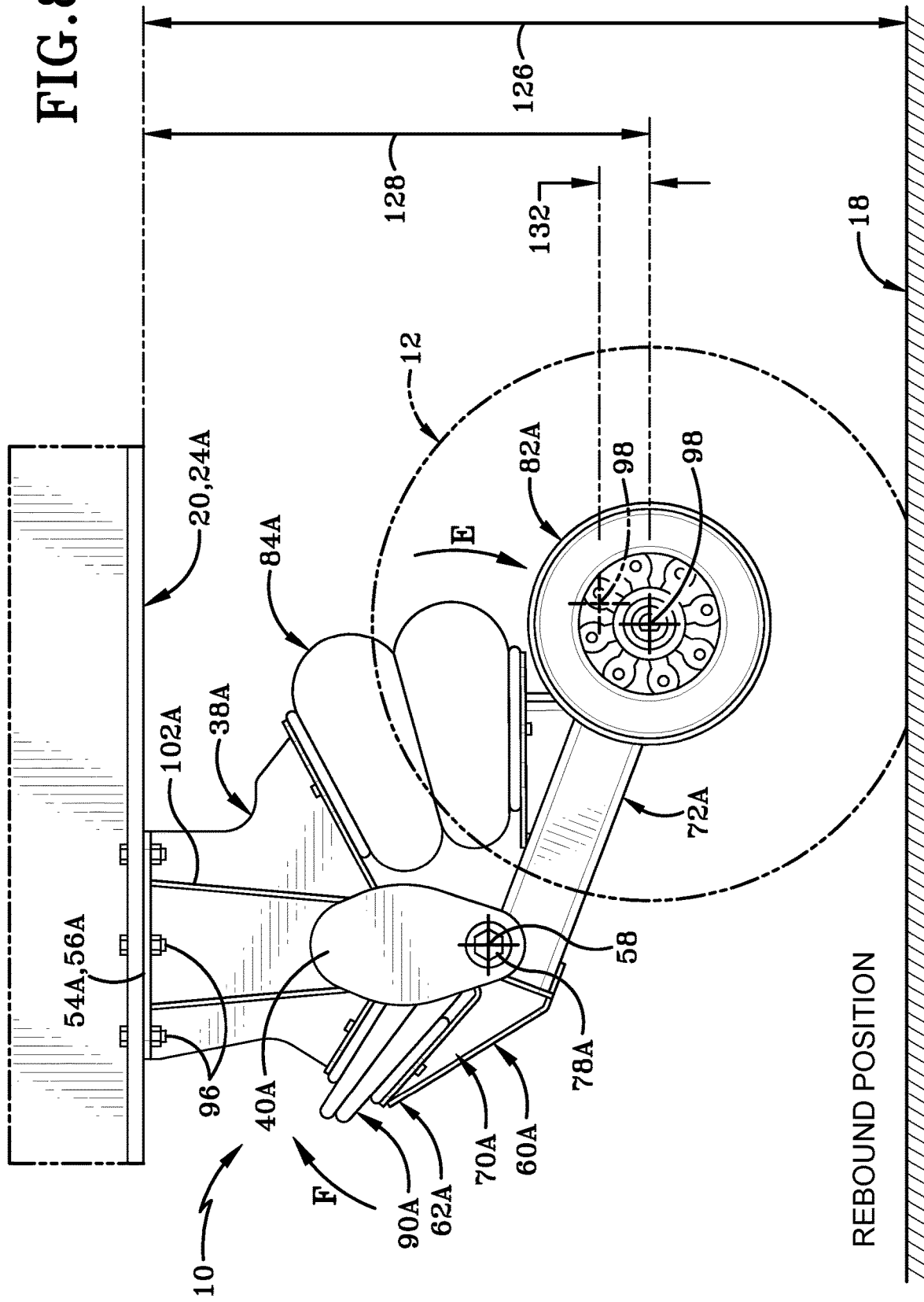

METHOD OF INSTALLING INTEGRATED LIFT AXLE SUSPENSION SYSTEM

TECHNICAL FIELD

This disclosure is directed generally to auxiliary independent axle air suspension assemblies for trailers.

BACKGROUND ART

A conventional independent axle suspension system for a trailer that utilizes airbags is commonly known as an air suspension system. This system is designed to improve ride comfort, stability, and load-carrying capacity of the trailer.

In general, the air suspension system has air springs, often referred to as airbags. These airbags are made of heavy-duty rubber or other durable materials. They are mounted between the trailer frame and the axle or wheel assembly. The airbags contain compressed air, and their purpose is to support the weight of the trailer and its cargo, providing a cushioning effect and allowing for height adjustment.

To maintain proper air pressure in the airbags, tractor supplied compressed air is added from an air compressor usually installed in the system. The compressor is responsible for pressurizing the airbags, and it can be powered by the trailer's electrical system or an onboard power source.

Air valves control the flow of air into and out of the airbags. These valves can be manually or automatically controlled, depending on the sophistication of the suspension system. Automatic control systems adjust air pressure as needed to maintain a desired axle load, a constant ride height and/or provide a smoother ride.

Some air suspension systems are equipped with shock absorbers (dampers) to enhance ride quality and stability. These dampers help control the oscillations and vibrations of the trailer, improving handling and safety.

When a trailer is hitched to a vehicle, the air suspension system is activated. The air compressor pressurizes the airbags to a specified level, depending on the trailer's weight and the desired axle load. As the trailer travels over uneven terrain or experiences load shifts, the air valves adjust the air pressure in the airbags to maintain a consistent ride height. This ensures that the trailer remains level and stable. The shock absorbers help dampen any vibrations or shocks that occur during the trailer's movement, providing a smoother and more comfortable ride.

Some trailers have auxiliary independent axle air suspension systems designed for trailers subject to bridge laws that are engineered to help trailers comply with weight distribution regulations, especially those that apply to bridge or axle weight limits. These systems provide enhanced flexibility and adjustability to distribute the load evenly across all axles of a trailer, ensuring that it complies with legal weight restrictions. In these configurations, each wheel on the trailer is equipped with its own independent suspension system, such as an independent air suspension. This means that each wheel can move up and down independently, allowing for precise load adjustment.

SUMMARY OF THE INVENTION

While air suspension systems for independent axle suspensions, such as auxiliary wheels, offer several advantages, there is room for improvement due to certain limitations and evolving needs. Air suspension systems can be more complex than conventional suspensions, which means they are more susceptible to issues and failures. Simplifying the design and making it more robust could improve reliability. Air suspension components, such as airbags and compressors, can add weight to a vehicle or trailer. Reducing the weight of these components or finding lightweight materials without sacrificing strength would be a significant improvement. While air suspension systems provide adjustability for ride height and load leveling, improving the precision and responsiveness of these adjustments, especially under varying load conditions, could enhance performance and comfort. Better integration with other vehicle systems, such as electronic stability control, adaptive damping systems, and autonomous driving features, would contribute to overall vehicle safety and performance. Air suspension systems can sometimes struggle to cope with very rough and uneven terrains. Enhancing the system's ability to absorb shocks and vibrations on challenging road surfaces would be an improvement. Designing air suspension systems that can be optimized for specific applications, such as heavy-duty commercial trucks and trailers, would lead to better performance and efficiency in those use cases. Increasing the lifespan of air suspension components and making them more resistant to wear and tear, especially in high-stress environments, is an ongoing area for improvement.

Thus, while auxiliary independent axle air suspension systems offer advantages in terms of load distribution and compliance, there is room for improvement in terms of complexity, cost, reliability, energy efficiency, adaptability, safety, maintenance, environmental impact, user-friendliness, legal compliance, and compactness. These improvements can help make these systems more practical, cost-effective, and appealing to a broader range of trailer applications while addressing evolving industry needs and regulations. The present disclosure addresses these and other needs by providing an independent wheel auxiliary independent axle air suspension.

One exemplary embodiment of the present disclosure teaches an auxiliary suspension designed for trailers subject to bridge laws. These trailers normally have a high frame-to-ground dimension that require light weight suspensions with maximum axle travel to provide ground clearance for off highway applications. Axles that work with air suspensions are typically, though not required, to be rated at 7,000 (7K) pounds (lbs.) to 10,000 (10K) lbs. One exemplary application may use smaller tires that also allows maximum ground clearance when lifted.

Because of the longer axle travel that is required, problems have been experienced when using straight axles in conventional auxiliary air suspensions. Straight axles can bend under load if bottomed out and break due to the torque induced when one wheel is in full up (jounce) and the other end of the axle is in full down (rebound) position. Some embodiments of the present disclosure address these issues by providing independent wheels side-to-side that are pivotably coupled to brackets integrally formed with a cross support, to thereby eliminate the torque from the axle.

In one particular exemplary embodiment, an air suspension assembly may provide a total axle travel of about 13 inches, wherein there is about 3" of rebound travel/movement and about 10" of jounce travel/movement. One exemplary air suspension of the present disclosure may include a frame bracket that incorporates a round cross tube that reacts loads that normally go into the straight axle. The tube is much stronger than the 7K to 10K axle normally used.

In one exemplary embodiment, there are independent frame brackets that are integrally formed on a cross support member that enable mounting for the lift air spring and load air spring on each side of the trailer, respectively. However, in other embodiments, independent brackets are not required to mount these air springs on the trailer. In some embodiments, axle spindles or stub axles are welded to the suspension trailing beams without "U" bolts. The pivots for the trailing beams or arms may have widely spaced steel bearings that spread out the load generated by the torque. They also maintain toe and camber of the wheel end. In this exemplary configuration, the independent wheel construction allows the tires to travel straight up and down. The tire distance to the trailer frame remains constant throughout axle travel and side loads. Additionally, the frame bracket construction/configuration eliminates the requirement for cross members over the lift air springs and load air springs. In some embodiments, shocks are optional.

In one aspect, an exemplary embodiment of the present disclosure may provide an air suspension assembly for an auxiliary wheel on a trailer, the suspension assembly comprising: a cross support member that is adapted to mount transversely between opposing rails of a trailer; a first bracket integrated to the cross support member; a first beam pivotably coupled to the first bracket, wherein the first beam pivots about a pivot axis located between a forward end and a rear end of the first beam defining a teeter-totter configuration of the first beam relative to the first bracket; a first load air bag located rearward of the pivot axis, and the first load air bag positioned between the first beam and the first bracket; a first lift air bag located forward of the pivot axis, and the first lift air bag positioned between the first beam and the first bracket. This exemplary embodiment or another exemplary embodiment may further provide a jounce position of the first beam, wherein when the first beam pivots to the jounce position, the first load air bag is compressed relative to its normal position and the first lift air bag is extended relative to its normal position; and a rebound position of the first beam wherein when the first beam pivots to the rebound position, the first load air bag is extended relative to its normal position and the first lift air bag is compressed relative to its normal position. This exemplary embodiment or another exemplary embodiment may further provide that the forward end of the first beam is moveable between at least three different vertical heights that correspond to the normal position, the jounce position, and the rebound position. This exemplary embodiment or another exemplary embodiment may further provide that the forward end of the first beam is at its greatest vertical height in the rebound position and its lowest vertical height in the jounce position. This exemplary embodiment or another exemplary embodiment may further provide a first end and a second end of the cross support member, wherein the first bracket is integrated into the cross support member proximate the first end; a second bracket integrated to the cross support member proximate the second end; a second beam pivotably coupled to the second bracket, wherein the second beam pivots about the pivot axis located between a forward end and a rear end of the second beam defining a teeter-totter configuration of the second beam relative to the second bracket, wherein the second beam pivots independently of the first beam; a second load air bag located rearward of the pivot axis, and the second load air bag positioned between the second beam and the second bracket; and a second lift air bag located forward of the pivot axis, and the second lift air bag positioned between the second beam and the second bracket. This exemplary embodiment or another exemplary embodiment may further provide a jounce position of the second beam that is independent of the first beam, wherein when the second beam pivots to the jounce position, the second load air bag is compressed relative to its normal position and the second lift air bag is extended relative to its normal position; and a rebound position of the second beam that is independent of the first beam, wherein when the second beam pivots to the rebound position, the second load air bag is extended relative to its normal position and the second lift air bag is compressed relative to its normal position. This exemplary embodiment or another exemplary embodiment may further provide a length of the first beam measured from the forward end to the rear end, wherein the pivot axis is located closer to the forward end than the rear end. This exemplary embodiment or another exemplary embodiment may further provide that the pivot axis is located about ⅓ the length from the forward end and about ⅔ the length from the rear end of the first beam. This exemplary embodiment or another exemplary embodiment may further provide a transversely extending tube defining a bore, wherein the transversely extending tube is connected to the first beam; and a pivot pin that defines the pivot axis, wherein the pivot pin extends through the bore and couples the first beam to the first bracket. This exemplary embodiment or another exemplary embodiment may further provide a first needle bearing that surrounds the pivot pin within the bore. This exemplary embodiment or another exemplary embodiment may further provide a second needle bearing that surrounds the pivot pin within the bore. This exemplary embodiment or another exemplary embodiment may further provide a sleeve that surrounds the pivot pin and is located within the bore between the first needle bearing and the second needle bearing. This exemplary embodiment or another exemplary embodiment may further provide a first mounting surface for the first load air bag, wherein the first mounting surface is oriented at an angle that is in a range from about 30 degrees to about 60 degrees relative to level ground. This exemplary embodiment or another exemplary embodiment may further provide a second mounting surface for the first lift air bag, wherein the second mounting surface is oriented at an angle that is in a range from about 10 degrees to about 40 degrees relative to level ground. This exemplary embodiment or another exemplary embodiment may further provide that the first bracket is a first hanger bracket integrally formed with the first end of the cross support member, wherein the first hanger bracket comprises a first plate and a second plate, wherein each of the first plate and the second plate has an upper end and a lower end, wherein the upper end of each of the first plate and the second plate is integrally formed with the cross support member and the lower end of each of the first plate and the second plate extends downwardly from the cross tube defining a lower depending portion of each plate, wherein each of the first plate and the second plate define a transversely aligned aperture therethrough, wherein the pivot axis extends through the transversely aligned aperture of the first plate and the second plate. This exemplary embodiment or another exemplary embodiment may further provide a rear portion of the first beam located rearward from the pivot axis; a top surface of the first beam at the rear portion; a mounting surface for the first load air bag that is connected to the first beam, wherein the mounting surface is oriented at an angle relative to the top surface of the rear portion of the first beam. This exemplary embodiment or another exemplary embodiment may further provide that the angle of the mounting surface is in a range from about 10° to about 35° relative to the top surface of the rear portion of the first beam. This exemplary embodiment or another exemplary embodiment may further provide a forward portion of the first beam located forward of the pivot axis; a rear portion of the first beam located rearward of the pivot axis; an angle defined between the forward portion and the rear portion that is in a range from about 130° to about 170°.

In yet another aspect, an exemplary embodiment of the present disclosure may provide a suspension assembly for an auxiliary wheel on a trailer, the suspension assembly comprising: a bracket comprising a first mounting surface and a second mounting surface, wherein the first mounting surface is oriented at an angle in a range from about 30 degrees to about 60 degrees relative to level ground and wherein the second mounting surface is oriented at an angle in a range from about 10 degrees to about 40 degrees relative to level ground; a beam having a forward end and rear end defining a length of the beam therebetween, wherein the length of the beam is oriented parallel to the forward direction of travel of the trailer; a pivot bolt defining a pivot axis about which the beam pivots, wherein the pivot bolt indirectly couples the beam to the mount; wherein the pivot axis is located between the forward end and the rear end of the beam, wherein a forward portion of the beam is located forward of the pivot axis and a rear portion of the beam is located rearward of the pivot axis, wherein a third mounting surface is located on the rear portion of the beam and a fourth mounting surface is located on the forward portion of the beam; a first needle bearing that surrounds the pivot bolt; a load air bag having an upper end mounted to the first mounting surface on the mount and a lower end mounted to the third mounting surface located on the rear portion of the beam; and a lift air bag having an upper end mounted to the second mounting surface on the mount and a lower end mounted to the fourth mounting surface located on the forward portion of the beam; wherein the pivot axis is located between the load air bag and the lift air bag thereby defining a teeter-totter configuration of the beam relative to the bracket.

In yet another aspect, an exemplary embodiment of the present disclosure may provide a suspension assembly for an auxiliary wheel on a trailer, the suspension assembly comprising a cross tube having a first end and a second end defining a length of the cross tube therebetween, wherein the length of the cross tube extends along a transverse axis and the transverse axis is configured to be oriented in a transverse direction relative to the trailer that is perpendicular to a forward direction of the travel of the trailer, and the cross tube having a top surface and a bottom surface, wherein the cross tube is configured to be coupled to a trailer frame; and a first hanger bracket integrally formed with the first end of the cross tube, wherein the first hanger bracket comprises a first plate and a second plate, wherein each of the first plate and the second plate has an upper end and a lower end, wherein the upper end of each of the first plate and the second plate is integrally formed with the cross tube and the lower end of each of the first plate and the second plate extends downwardly from the cross tube defining a lower depending portion of each plate, wherein each of the first plate and the second plate define a transversely aligned aperture therethrough.

In yet another aspect, an exemplary embodiment of the present disclosure may provide a method comprising: assembling an air suspension assembly to create an assembled air suspension assembly, the assembled suspension assembly comprising a cross support member that is adapted to mount transversely between opposing rails of a trailer, a first bracket integrated to the cross support member, a first beam pivotably coupled to the first bracket, wherein the first beam pivots about a pivot axis located between a forward end and a rear end of the first beam defining a teeter-totter configuration of the first beam relative to the first bracket, a first load air bag located rearward of the pivot axis, and the first load air bag positioned between the first beam and the first bracket, and a first lift air bag located forward of the pivot axis, and the first lift air bag positioned between the first beam and the first bracket; providing the assembled air suspension assembly to a customer; effecting the customer to install the assembled air suspension on a trailer; and effecting the customer to couple an auxiliary wheel to the air suspension without adjusting wheel toe, wheel camber, or caster angle. This exemplary method or another exemplary method may further provide that effecting the customer to install the assembled air suspension on a trailer is accomplished by effecting the customer to bolt the assembled air suspension to an underside of a frame rail on the trailer. This exemplary method or another exemplary method may further provide that effecting the customer to install the assembled air suspension on a trailer is accomplished by effecting the customer to install the assembled air suspension forwardly of a set of primary rear wheels, wherein the primary rear wheels are adapted to continuously engage the ground. This exemplary method or another exemplary method may further provide for effecting the customer to move the first beam from a normal position to a jounce position, wherein movement of the first beam to the jounce position is accomplished by pivoting the first beam about the pivot axis, compressing the first load air bag, and extending the first lift air bag. This exemplary method or another exemplary method may further provide for effecting the customer to move the first beam from a normal position to a rebound position, wherein movement of the first beam to the rebound position is accomplished by pivoting the first beam about the pivot axis, extending the first load air bag, and compressing the first lift air bag. This exemplary method or another exemplary method may further provide for effecting the customer to move the forward end of the first beam between at least three different vertical heights that correspond to a normal position, a jounce position, and a rebound position. This exemplary method or another exemplary method may further provide for effecting the customer to move a forward end of a second beam independently of movement of the first beam, wherein the second beam is positioned on an opposite side of the assembled air suspension assembly than the first beam, wherein the second beam pivots about the pivot axis located between the forward end and a rear end of the second beam defining a teeter-totter configuration of the second beam relative to a second bracket at a second end of the cross support member, a second load air bag located rearward of the pivot axis, and the second load air bag positioned between the second beam and the second bracket, and a second lift air bag located forward of the pivot axis, and the second lift air bag positioned between the second beam and the second bracket.

In yet another aspect, an exemplary embodiment of the present disclosure may provide a method comprising: receiving an assembled air suspension assembly, the assembled air suspension assembly comprising a cross support member that is adapted to mount transversely between opposing rails of a trailer, a first bracket integrated to the cross support member, a first beam pivotably coupled to the first bracket, wherein the first beam pivots about a pivot axis located between a forward end and a rear end of the first beam defining an unbalanced teeter-totter configuration of the first beam relative to the first bracket, a first load air bag located rearward of the pivot axis, and the first load air bag positioned between the first beam and the first bracket, and a first lift air bag located forward of the pivot axis, and the first lift air bag positioned between the first beam and the first bracket; installing the assembled air suspension assembly on a trailer; and coupling an auxiliary wheel to the air suspension assembly without adjusting wheel toe, wheel camber, or caster angle. This exemplary method or another exemplary method may further provide for moving the first beam from a normal position to a jounce position, wherein moving the first beam to the jounce position is accomplished by pivoting the first beam about the pivot axis, compressing the first load air bag, and extending the first lift air bag. This exemplary method or another exemplary method may further provide for moving the first beam from a normal position to a rebound position, wherein moving the first beam to the rebound position is accomplished by pivoting the first beam about the pivot axis, extending the first load air bag, and compressing the first lift air bag. This exemplary method or another exemplary method may further provide for moving the forward end of the first beam between at least three different vertical heights that correspond to a normal position, a jounce position, and a rebound position. This exemplary method or another exemplary method may further provide for moving a forward end of a second beam independently of movement of the first beam, wherein the second beam is positioned on an opposite side of the assembled air suspension assembly than the first beam, wherein the second beam pivots about the pivot axis located between the forward end and a rear end of the second beam defining a teeter-totter configuration of the second beam relative to a second bracket at a second end of the cross support member, a second load air bag located rearward of the pivot axis, and the second load air bag positioned between the second beam and the second bracket, and a second lift air bag located forward of the pivot axis, and the second lift air bag positioned between the second beam and the second bracket. This exemplary method or another exemplary method may further provide that installing the assembled air suspension on a trailer is accomplished by bolting the assembled air suspension to an underside of a frame rail on the trailer. This exemplary method or another exemplary method may further provide that installing the assembled air suspension on a trailer is accomplished by installing the assembled air suspension forwardly of a set of primary rear wheels, wherein the primary rear wheels are adapted to continuously engage the ground.

In yet another aspect, an embodiment of the present disclosure may provide an air suspension assembly for an auxiliary wheel on a trailer, the air suspension assembly comprising: a cross support member that is adapted to mount transversely between opposing rails of a trailer; a first end and a second end of the cross support member; a first bracket that is integrally formed with the cross support member and located proximate the first end of the cross support member; a first beam pivotably coupled to the first bracket, wherein the first beam pivots about a pivot axis located between a forward end and a rear end of the first beam defining a teeter-totter configuration of the first beam relative to the first bracket; a second bracket that is integrally formed with the cross support member and located proximate the second end of the cross support member; a second beam pivotably coupled to the second bracket, wherein the second beam pivots about the pivot axis located between a forward end and a rear end of the second beam defining a teeter-totter configuration of the second beam relative to the second bracket, wherein the second beam pivots independently of the first beam; wherein integral formation of the first bracket and the second bracket with the cross support member is adapted to increase structural integrity, enhance rigidity, and improve load distribution of the air suspension assembly.

BRIEF DESCRIPTION OF THE DRAWINGS

Sample embodiments of the present disclosure are set forth in the following description, are shown in the drawings and are particularly and distinctly pointed out and set forth in the appended claims.

FIG. 4B (FIG. 4B) is a top, rear, first side isometric and exploded view of one of the two beams, along with its bearings, pivot pin and brake assembly.

FIG. 7A is an elevation cross-section view of the suspension assembly taken along line 7A-7A in FIG. 6.

FIG. 8B is a side elevation operational view of the suspension assembly in its lifted or jounce position.

FIG. 8C is a side elevation operational view of the suspension assembly in its rebound position.

Similar numbers refer to similar parts throughout the drawings.

DETAILED DESCRIPTION

Figure 1:
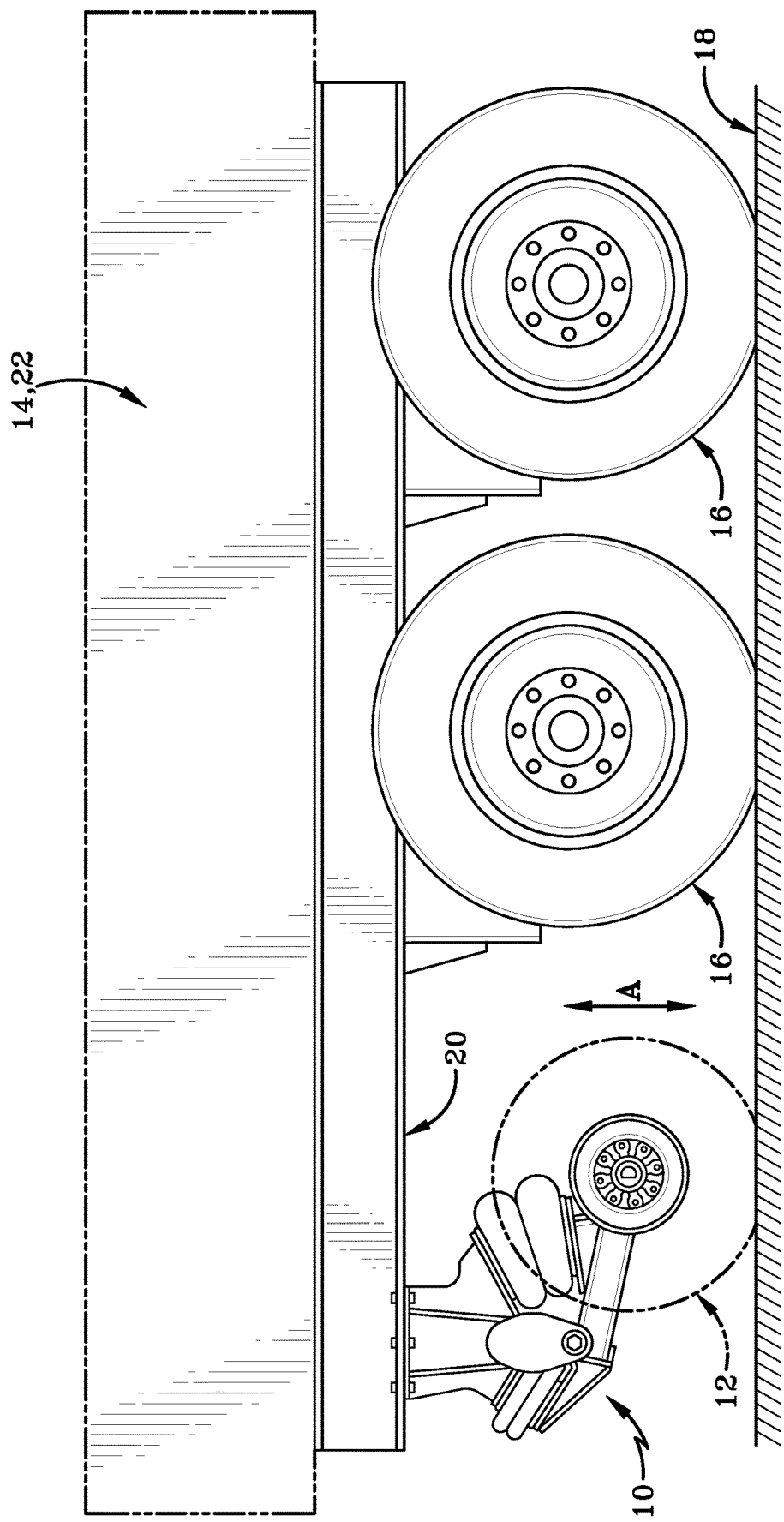
FIG. 1 is a side elevation view of an integrated lift axle suspension assembly according to one exemplary embodiment of the present disclosure shown mounted on a trailer forwardly of the trailer's primary wheels.

FIG. 1 depicts a lift axle suspension assembly 10 for an auxiliary wheel 12 on a trailer 14. The lift axle suspension assembly 10 and auxiliary wheel 12 are positioned forwardly of a set of primary rear wheels 16 relative to a forward drive direction of the trailer. The auxiliary wheel 12 typically has a smaller diameter than the rear wheels 16. The rear wheels 16 are conventional wheels that are not purposefully displaced between raised and lowered positions absent movement in response to roadway conditions. The auxiliary wheel can be raised and lowered, as indicated by Arrow A, to selectively engage or disengage the auxiliary wheel 12 from contact with the road or ground 18. The auxiliary wheel 12 is typically lowered, as indicated by Arrow A, to engage the ground 18 or road when the trailer 14 is carrying a heavier load so as to spread and/or distribute the load weight across more axles on the trailer. However, when a light load or no load is in the trailer 14, the auxiliary wheel 12 may be raised, as indicated by Arrow A, above the road or ground 18 so as to not engage the road as the trailer 14 moves or is towed by a vehicle (not shown), such as a truck. Stated otherwise, auxiliary wheels 12 are designed to operate with suspension assembly 10 that allows them to move up and down depending on the weight of the load. This feature enables them to distribute the weight more evenly, resulting in improved stability and reduced wear and tear on the trailer. Assembly 10 may dynamically adjust to the changing load conditions, making it a versatile choice for various hauling scenarios. In contrast, conventional rear wheels 16 on trailer 14 remain fixed and do not have the capacity to adjust to variations in load weight.

The trailer 14 has a frame 20 that supports a trailer compartment 22 there above. The compartment 22 may be either enclosed (e.g., a box trailer compartment) or partially enclosed (e.g., an open-top compartment). Alternatively, the frame 20 could support a flatbed that is open to the environment. The trailer frame 20 is supported from below by the rear wheels 16.

Figure 2:
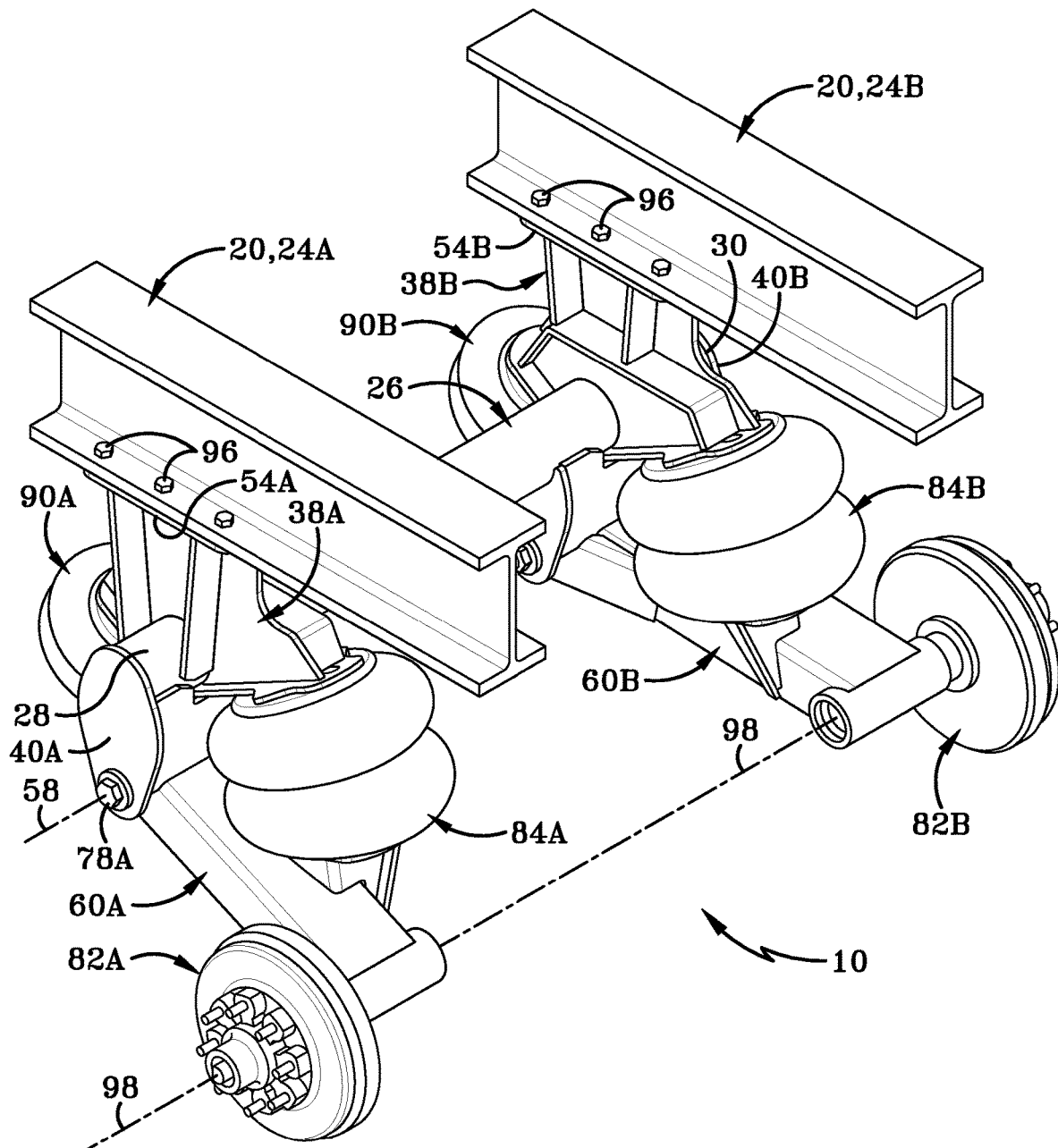
FIG. 2 is a top, rear, first side isometric view of the suspension assembly mounted on a trailer frame.
Figure 6:
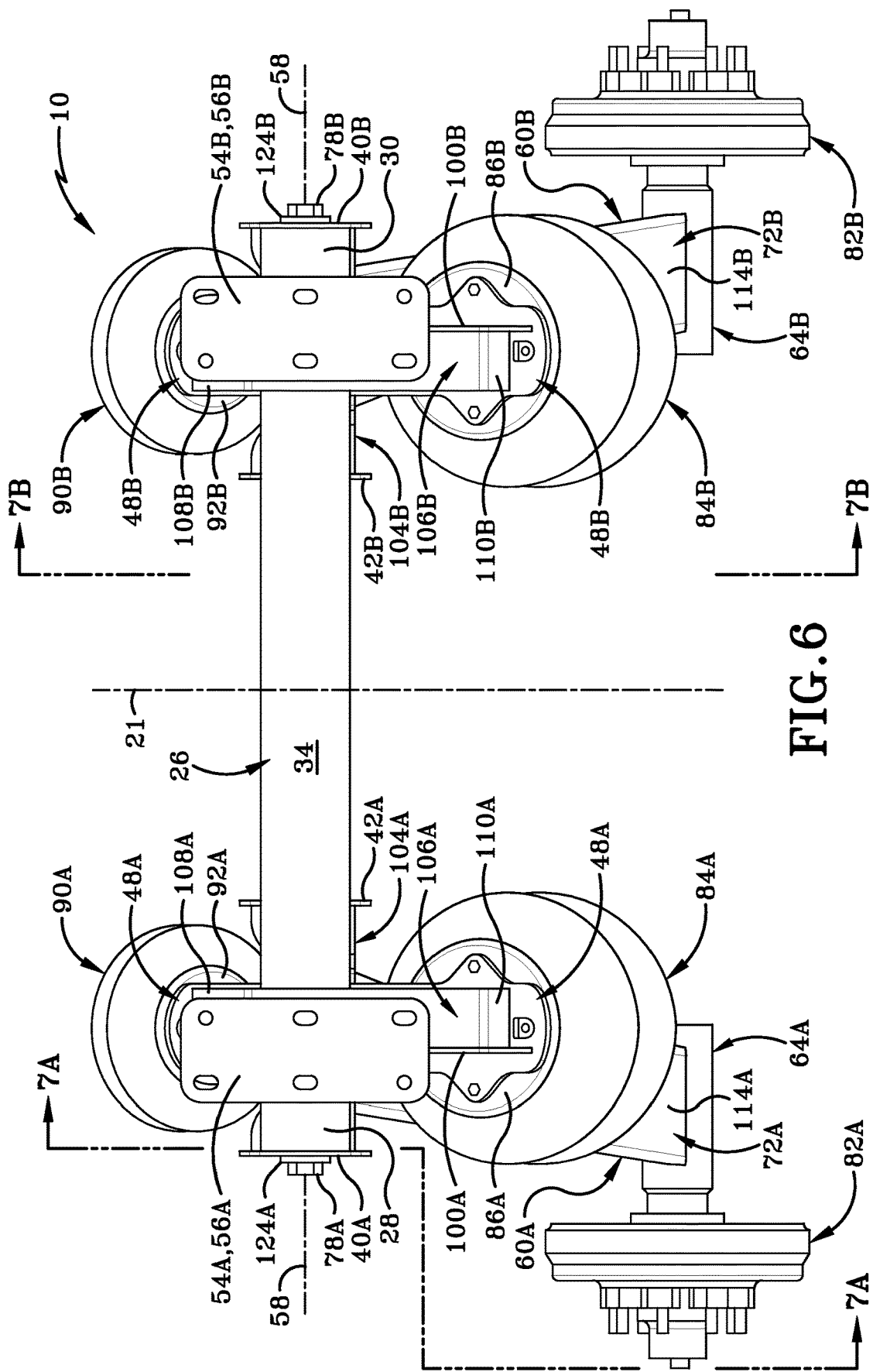
FIG. 6 (FIG. 6) is a top plan view of the suspension assembly.

FIG. 2 depicts that the trailer frame 20 may have a first rail 24A and second rail 24B. The rails 24A, 24B have a length that is oriented in a longitudinal direction parallel to longitudinal center axis 21 (see FIG. 6). The rails 24A, 24B extend parallel relative to each other and are aligned parallel to the forward drive direction of the trailer. The first rail 24A may correspond to a first side of the trailer 14, such as the left side or driver side, and the second rail 24B may correspond to the second side of the trailer, such as the right side or passenger side. The trailer frame 20 may also have cross rails (not shown) or other support members that extend in a transverse direction that is perpendicular, angled, or otherwise not parallel to the drive direction/longitudinal direction of the trailer 14. In one particular embodiment, the suspension assembly 10 is mounted to the longitudinal rails 24A, 24B, however it is entirely possible to mount the assembly 10 on one of the other frame support members, such as a cross frame member, without departing from the scope of the present disclosure.

With continued reference primarily to FIG. 2-FIG. 5, the lift axle air suspension assembly 10 is fabricated from various components, which are detailed herein. These components of suspension assembly 10 can be made of any structural material that has the strength to support the trailer and effectuate the operation of the assembly 10. For example, the various components of assembly could be manufactured from steel, stainless steel, aluminum, titanium, or other composite materials.

The lift axle air suspension assembly 10 has an axle (or two stub axles) that can be raised or lowered based on the load requirements. When the trailer is fully loaded, the lift axle is typically lowered to provide additional support and distribute the weight more evenly. When the load is lighter or the trailer is empty, the lift axle can be raised to improve fuel efficiency and reduce tire wear. The lift axle air suspension assembly 10 allows for on-the-fly adjustment of the axle position, while the air suspension assembly enables fine-tuning of ride height and stiffness. The lift axle assists in optimizing load distribution by adjusting its position based on the load weight. While some other conventional suspension assemblies may offer adjustable features, they may not provide as much on-the-fly adjustability as a lift axle with air suspension. Further, in these other conventional suspension assemblies the load distribution is primarily managed through the design and configuration of the trailing arm suspension system.

Suspension assembly 10 may include a cross member, cross tube, or cross support (generally referred to as a cross member 26) having a first end 28 and a second end 30 defining a length of the cross member 26 therebetween. The length of the cross member 26 extends along a transverse axis 32 and the transverse axis 32 is configured to be oriented in a transverse direction relative to the trailer 14 that is perpendicular to a forward direction of the travel (i.e., the longitudinal direction) of the trailer 14. The length of the cross member 26 may be selected to fit or correspond to the size of the trailer to which the assembly 10 is mounted. In one embodiment, the length of the cross member 26 is greater than about 45 inches and less than about 72 inches. In one particular embodiment, the length of the cross support member 26 is in a range from about 50 inches to about 53 inches. In one embodiment, the cross member 26 is hollow and tubular in configuration, defining a bore therein that extends in the transverse direction. Cross member 26 carries the vertical and/or rotational load that would normally be carried by an axle in a conventional air suspension assembly.

The cross member 26 has a top portion 34 or top surface and a bottom portion 36 or bottom surface. If the cross member 26 is circular in cross section, then the exterior surface would be continuous and the top portion 34 and the bottom portion 36 would simply denote the respective orientations of the portion of the member 26 that faces upward and the portion of the tube that faces downward, respectively. However, if the member 26 was square or rectangular in cross section, then there would be distinct exterior surfaces that would define a top surface 34 and bottom surface 36. Alternatively, the cross member 26 can have other cross sectional configurations, such as triangular or oval or another other symmetric or asymmetric configuration, depending on the application specific needs or purpose of suspension assembly 10. Regardless of the cross member 26 cross-sectional configuration, the cross member 26 is configured to be coupled to the trailer frame 20. The cross member 26 carries the load that would normally be carried by an axle in a conventional suspension assembly. The cross member assists in optimizing load distribution when the position of the beams (discussed below) is moved based on the load weight.

The description of suspension assembly 10 is continued below. Notably, some portions of the suspension assembly 10 are symmetric about the longitudinal axis 21. For brevity of this description, some parts will be discussed with respect to only one side of the suspension assembly 10. Some reference numerals utilized herein and depicted in the Figures that correspond to components of assembly 10 will be provided with either of the suffixes "A" or "B". The reference numeral suffixes that end with the letter "A" are to be understood to correspond with those parts/components on the first side of the suspension assembly 10 and the reference numeral suffixes that end with the letter "B" shall be understood to correspond with those parts/components on the second side of the suspension assembly 10. Further, to the extent that any reference element with a suffix is shown in the Figures but not specifically discussed herein, it is to be understood that the undiscussed component/part is the same and in a symmetrical mirrored orientation as a component/part that is discussed herein. Particularly, for brevity some portions of this specification may only discuss parts/components with the suffix "A" that correspond to the first side of the suspension assembly 10 and not the components/parts with the suffix "B" that correspond to the second side. In those instances, it should be understood that those components with the suffix "B" are the same, and oriented in a mirrored symmetrical position, as those components described with the suffix "A."

Suspension assembly 10 includes a first bracket 38A proximate the first end 28 of the cross member 26. The first bracket comprises a first plate 40A and a second plate 42A. Each of the first plate 40A and the second plate 42A has an upper end and a lower end. Each of the first plate 40A and the second plate 42A is connected with the cross member 26. In one embodiment, each of the first plate 40A and the second plate 42A of the first bracket 38A is integrally formed with the cross member 26. In one particular embodiment, the upper end of each of the first plate 40A and the second plate 42A is integrally formed and fixedly connected to the cross member 26. In another particular embodiment, the lower end of each of the first plate 40A and the second plate 42A extends downwardly from the cross member 26, below the bottom portion 36, defining a lower depending portion of each plate 40A, 42A, respectively. Each of the first plate 40A and the second plate 42A define a transversely aligned aperture therethrough. More particularly, aperture 44A is defined in the lower depending portion of first plate 40A and aperture 46A is formed in the lower depending portion of second plate 42A. A gap or space is defined between the lower depending portions of first plate 40A and second plate 42A. The gap is configured to receive another component of assembly therebetween, namely, a trailing arm or beam 60A, which will be described in greater detail below. The gap has a dimension, measured in the transverse direction, that ranges from about 5 inches to about 16 inches. The width of the gap establishes a greater control or greater amount in stiffness in roll where the beam connects to the bracket. As such, the two plates 40A, 42A spaced by the relatively wide gap provides for no additional need for stiffness or roll control. In essence the gap between the two plates 40A, 42A where the beam connects to the hanger bracket allows roll movement to be controlled.

A first mount 48A is located proximate to the first end 28 of the cross member 26. First mount 48A is located transversely between the first plate 40A and the second plate 42A. The first mount 48A includes a first mounting surface 50A and a second mounting surface 52A. The first mounting surface 50A is located rearward of the transverse axis 32 of the cross member 26. The second mounting surface 52A is located forward of the transverse axis 32 of the cross member 26. The first mounting surface 50A is flat and oriented at an angle in a range from about 30 degrees to about 60 degrees relative to level ground 18. The second mounting surface 52A is flat and oriented at an angle in a range from about 10 degrees to about 40 degrees relative to level ground 18. The first mount 48A includes a plate 54A defining top surface 56A that is located above the top surface 34 of the cross member 26. The top surface 56A of the first mount 48A is configured to be mounted directly to an underside of the trailer frame 20, such as the first rail 24A.

In one exemplary embodiment, there may be some advantages or criticality to the described angled ranges of the mounting surfaces 50A, 52A. As will be described in greater detail herein, the mounting surfaces 50A, 52A are used to mount air bags (i.e., load air bag 84A and lift air bag 90A). Mounting an airbag in a trailing arm suspension assembly 10 at a specific angle within the described ranges relative to level ground has advantages. The orientation of the airbag affects its performance and the overall behavior of the suspension assembly 10. The primary function of the airbags in the suspension assembly 10 is to support and adjust the load carried by the vehicle or trailer 14. Mounting the airbag(s) at an angle within the specified range ensures that it can efficiently distribute the load across the suspension components. This helps maintain proper weight balance, which is advantageous for vehicle or trailer 14 stability, handling, and ride comfort. The angle of the mounting surfaces 50A, 52A and connected airbag can impact the ride height of the vehicle or trailer 14. By adjusting the angle within the specified range, the suspension assembly 10 can be designed to achieve the desired ride support for the vehicle. The angle of the mounting surfaces 50A, 52A and connected airbag is integral to the suspension geometry. It affects factors like camber, caster, and toe, which influence how the vehicle's or trailer's wheels interact with the road surface. Proper alignment and geometry are essential for maintaining tire contact and traction, as well as ensuring even tire wear. The angle at which the airbag is mounted impacts the overall ride comfort and handling characteristics of the vehicle or trailer 14. A well-designed angle of surfaces 50A, 52A helps in controlling body roll, pitch, and drive during various driving conditions, enhancing both comfort and performance. Mounting the airbag at the correct angle within the specified range is advantageous for maintaining the vehicle's or trailer's stability. A properly configured suspension system contributes to better control, reduced sway, and improved braking performance, all of which are advantageous for safe driving. The angle at which the airbag is mounted can influence the durability and longevity of the suspension system. When the airbag is correctly oriented, it may experience less stress and wear, leading to a longer service life and reduced maintenance requirements.

A second bracket 38B is proximate the second end 30 of the cross member 26. The second bracket 38B comprises plate 40B (which may be referred to as a third plate or another designated numbered plate in the appended claims) and plate 42B (which may be referred to as a fourth plate or another designated numbered plate in the appended claims). Each of the plates 40B, 42B has an upper end and a lower end. The upper end of each of the plates 40B, 42B may be connected to the cross member 26 and the lower end of each of the plates 40B, 42B extends downwardly from the cross member 26 defining a lower depending portion of each plate 40B, 42B. Each of the plates 40B, 42B define a transversely aligned aperture 44B, 46B, respectively, therethrough. The apertures 44B, 46B are transversely aligned with the apertures 44A, 46A along a pivot axis 58, the purpose of which will be described in greater detail herein.

A second mount 48B is located proximate to the second end 30 of the cross member 26 that is positioned between the plate 40B and the plate 42B. The second mount 48B includes a mounting surface 50B (which may be referred to as a third mounting surface or another designated numbered surface in the appended claims) and a mounting surface 52B (which may be referred to as a fourth mounting surface or another designated numbered surface in the appended claims), wherein the third mounting surface 50B is located rearward of the transverse axis 32 of the cross member 26 and the fourth mounting surface 52B is located forward of the transverse axis 32 of the cross member 26. The mounting surface 50B is flat and oriented at an angle in a range from about 30 degrees to about 60 degrees relative to level ground 18 and wherein the mounting surface 52B is flat and oriented at an angle in a range from about 10 degrees to about 40 degrees relative to level ground 18. The second mount 48B includes a top surface 56B that is located above the top surface 34 of the cross member 26, and the top surface 56B of the second mount 48B is configured to be mounted directly to an underside of the trailer frame 20, such as to the underside of the second rail 24B.

FIG. 4B depicts that the suspension assembly 10 may further include a first beam 60A having a forward end 62A and rear end 64A defining a length of the first beam therebetween. The length of the first beam 60A is oriented parallel to the forward direction of travel of the trailer 14 and longitudinal axis 21 and perpendicular to the transverse axis 32 of the cross support member 26 and perpendicular to the transverse pivot axis 58. The first beam 60A has a transversely aligned first tube 66A defining a first bore 68A. The transversely aligned first tube 66A is located between the forward end 62A and the rear end 64A of the first beam 60A. In one particular embodiment, the length of the rear portion 72A on beam 60A is longer than the forward portion 70A of beam 60A. Stated otherwise, the tube 66A is located closer to the forward end 62A than the rear end 64A. This establishes that the portion of beam 60A is a trailing arm. In one embodiment, the tube 66A, and therefore the pivot axis 58, is positioned about 66% (i.e., ⅔) forward of the rear end 64A and about 33% (i.e., ⅓) rearward of the forward end 62A. Stated otherwise, if the total length of beam 60A is about 27 inches, then the tube 66A, and therefore pivot axis 58, would be located about 9 inches from the forward end 62A and about 18 inches from the rear end 64A. This establishes the unbalanced teeter-totter configuration. In one exemplary embodiment, this placement of the pivot axis 58 is more than a matter of an exemplary design choice. This configuration has been found to be advantageous for the operation of the load air bag and the lift air bag as the beam pivots between the rebound position and the jounce position. Further, this configuration has been determined to be beneficial to the smooth operation of the trailer as the wheels traverse the road by enabling the teeter-totter configuration to be slightly biased forward which increases the amount of travel afforded to the rear end 64A.

A forward portion 70A of the first beam 60A is located forward of the transversely aligned first tube 66A and a rear portion 72A of the first beam 60A is located rearward of the transversely aligned first tube 66A. A mounting surface 74A (which may be referred to herein or in the appended claims as a fifth mounting surface 74A) is located on the rear portion 72A of the first beam 60A and a mounting surface 76A (which may be referred to herein or in the appended claims as a sixth mounting surface 76A) is located on the forward portion 70A of the first beam 60A.

The forward portion 70A of the first beam 60A is oriented at an obtuse angle relative to the rear portion 72A of the first beam 60A that is located rearward of the transversely aligned first tube 66A. Stated otherwise, first beam 60A is not a straight beam with a tube 66A that extends across the beam between the forward portion and the rear portion. Namely, the forward portion 70A extends upward from the tube 66A. As such, if the rear portion 72A were laid flat and level to ground, then forward portion 70A extends upwardly from the tube 66A at an angle that can range from about 130° to about 170° relative to the rear portion 27A. In one particular embodiment, the forward portion 70A is angled upwardly at an angle between 140° and 160° relative to the rear portion 72A (which would correspond to an upward inclination from about 20° to about 40° relative to the level ground).

With continued reference to FIG. 4B, on the rear portion 72A of beam 60A, is a flange 112A that supports the mounting surface 74A. Flange 112A extends upwardly from the top surface 114A of the rear portion 72A. The flange 112A elevates the rear edge 115A of the mounting surface 74A above the top surface 114A of the rear portion 72A. The forward edge 116A of the mounting surface 74A may directly contact the top surface 114A of the rear portion 72A. In one embodiment, the flat mounting surface 74A is angularly elevated above the top surface 114A of the rear portion 72 an angle that can range from about 10° to about 35°. In one specific embodiment, the mounting surface 74A is angled at 20° relative to top surface 114A of rear portion 72A.

A first pivot bolt 78A defines at least a portion of the pivot axis 58 about which the first beam 60A pivots. The first pivot bolt 78A extends through the aperture 44A in the first plate 40A on the first bracket 38A, through the first bore 68A of the transversely aligned first tube 66A on the first beam 60A, and through the aperture 46A in the second plate 42A on the first bracket 38A. The first pivot bolt 78A couples the first beam 60A to the first bracket 38A and defines the fulcrum of the teeter-totter configuration of the first beam 60A relative to first bracket 38A. Although the pivot bolt 78A is depicted in this particular example, it is entirely possible to utilize a different type of pivoting connector without departing from the scope of the present disclosure. For example, instead of a bolt, it may be possible to utilize a hinge, bushings, pins, articulating arms, or swivel/rotary/universal joints.

At least one first needle bearing 80A surrounds the first pivot bolt 78A within the first bore 68A of the transversely aligned first tube 66A. In one particular embodiment, there are two needle bearings 80A that surround the first pivot bolt 78A within the first bore 68A. More particularly, there are two needle bearings, with each needle bearing 80A being located at respective ends within the bore 68A of tube 66A. The needle roller bearing 80A is a type of rolling element bearing designed to carry high radial loads with a relatively small cross-sectional profile. It has cylindrical rollers, or needle rollers, that are much longer in relation to their diameter than traditional ball bearings. These needle rollers are arranged in a cage or retainer to maintain proper spacing between them, allowing for smooth and efficient rotation. The widely spaced needle roller bearings (i.e., spaced on opposite ends of pivot bolt 78A) are designed to effectively distribute and spread out the load generated by torque. When the trailer 14 encounters uneven terrain or experiences forces that induce torsional stresses on the suspension system, these bearings 80A help to absorb and manage the torque, ensuring the stability and structural integrity of the trailer. By utilizing needle roller bearings 80A in widely spaced locations, the assembly 10 can better distribute the load across the suspension components. This helps prevent localized stress concentrations that could lead to premature wear or failure. Further, needle roller bearings 80A also play a role in maintaining the wheel's toe and camber angles. Toe refers to the angle of the wheels relative to each other, and camber refers to the vertical alignment of the wheel. Proper alignment is essential for even tire wear and optimal handling characteristics. The needle roller bearings contribute to the precise and consistent alignment of the wheel, ensuring it remains within specified tolerances. Needle roller bearings may handle high radial loads while maintaining low friction. This reduces wear on the suspension components, leading to increased durability and a longer service life for the system. Needle roller bearings are well-suited for applications with high radial loads. In an air suspension system, they can effectively handle the forces generated by the trailer's weight and cargo, ensuring that the system remains stable and reliable. Although needle bearings are preferred, other bearings are entirely possible. Bearings 80A also control stiffness such that there is no need for additional stiffness or roll control. In essence the location or area where the bearing 80A is installed on the hanger bracket 30A allows for movement to be controlled.

With continued reference to FIG. 4B, there may be a plurality of other components that effectuate the connection of the pivot bolt 78A to the beam 60A. For example, washers 118A may be located adjacent to one or both of the needle bearings 80A. There may also be a pivot bolt sleeve 120A that surrounds the shaft of the pivot bolt 78A when the pivot bolt is installed within the bore 68A of tube 66A. The sleeve 120A would be located exterior to the bolt 78A and between the two needle bearings 80A within bore 68A of tube 66A. When assembled, the washer 118A is adjacent to the interior surface of plate 40A. The needle bearing 80A circumscribes the pivot bolt 78A, and the pivot sleeve 120A contacts one of the needle bearings 80A. On the other end of the sleeve 120A is another needle bearing 80A. Another washer 118A contacts the interior surface of plate 42A. The end of the pivot bolt may be threaded and a washer and nut 122A may secure the threaded end of the bolt 78A. The washer 124A may have a collar that extends into the aperture 46A of plate 42A.

A first brake assembly 82A is coupled to or proximate the rear end 64A of the first beam 60A. The first brake assembly is adapted to couple with a first wheel and hub, such as auxiliary wheel 12. In one embodiment, the brake assembly 82A is a drum brake. The drum brake assembly 82A may include a brake drum that is a cylindrical metal component that attaches to the trailer's wheel hub. It rotates along with the wheel. The inner surface of the drum is smooth and provides the braking surface. Inside the drum, there are two curved brake shoes that are mounted on a backing plate. These shoes are typically lined with friction material, such as brake lining or brake pads. A wheel cylinder is a hydraulic component that sits between the brake shoes. When hydraulic pressure is applied, the wheel cylinder expands, forcing the brake shoes against the inner surface of the drum. The hydraulic pressure required to activate the wheel cylinder is typically supplied from the trailer's brake system, which may be electric, hydraulic, or air-powered, depending on the trailer type. Although the drum brake 82A is shown, other brakes are entirely possible and envisioned to be useful without departing from the scope of the present disclosure. For example, other brake assemblies that can be used on trailers instead of drum brakes include any of the following or others. Disc Brakes: Disc brakes are becoming increasingly popular on trailers. They consist of a rotor (disc) and a caliper. When hydraulic pressure is applied, the caliper squeezes the brake pads against the rotor, generating friction and slowing down the wheel's rotation. Disc brakes generally offer better stopping performance and require less maintenance than drum brakes; Electric Trailer Brakes: These brakes use electric current supplied from the towing vehicle's brake controller to activate the brake shoes or magnets inside the drum brake assembly. They are commonly used on smaller trailers and are easier to install and maintain than hydraulic systems. Hydraulic Surge Brakes: Surge brakes are typically found on boat trailers and some utility trailers. They use a hydraulic surge actuator that's activated by the trailer's movement relative to the towing vehicle. When the trailer pushes against the towing vehicle during braking, it compresses a master cylinder, applying hydraulic pressure to the drum brake system. Air Brakes: Air brake systems are used in heavy-duty commercial trailers and require an air compressor and a complex pneumatic system. They offer precise control and high stopping power but are primarily used in specialized applications. The choice of brake assembly depends on factors such as the trailer's size, weight capacity, intended use, and local regulations.

Suspension assembly 10 further includes a second beam 60B having a forward end 62B and rear end 64B defining a length of the second beam 60B therebetween. The length of the second beam 60B is oriented parallel to the forward direction of travel of the trailer and perpendicular to the transverse axis 32. The second beam has a transversely aligned second tube 66B defining a second bore 68B. The transversely aligned second tube 66B is located between the forward end 62B and the rear end 64B of the second beam. A forward portion 70B of the second beam 60B is located forward of the transversely aligned second tube 66B and a rear portion 72B of the second beam 60B is located rearward of the transversely aligned second tube 66B. A mounting surface 74B (which may be referred to as a seventh mounting surface or another designated numbered surface in the appended claims) is located on the rear portion 72B of the second beam 60B. A mounting surface 76B (which may be referred to as an eighth mounting surface or another designated numbered surface in the appended claims) is located on the forward portion 70B of the second beam 60B.

A second pivot bolt 78B defines a portion of the pivot axis 58 about which the second beam 60B pivots. The second pivot bolt 78B extends through the aperture 44B in the third plate 40B on the second bracket 38B, through the second bore 68B of the transversely aligned second tube 66B on the second beam 60B, and through the aperture 46B in the fourth plate 42B on the second bracket 38B. The second pivot bolt 78B couples the second beam 60B to the second bracket 38B. A second needle bearing 80B surrounds the second pivot bolt 78B within the second bore 68B of the transversely aligned second tube 66B. A second brake assembly 82B is coupled to the rear end 64B of the second beam 60B, wherein the second brake assembly is adapted to couple with a second wheel and hub, such as another auxiliary wheel 12.

Suspension assembly 10 further includes a first load air bag 84A having an upper end 86A mounted to the first mounting surface 50A on the first mount 48A and a lower end 88A mounted to the fifth mounting surface 74A located on the rear portion 72A of the first beam 60A. A second load air bag 84B has an upper end 86B mounted to the third mounting surface 50B on the second mount 38B and a lower end 88B mounted to the seventh mounting surface 74B located on the rear portion 72B of the second beam 60B.

Suspension assembly 10 further includes a first lift air bag 90A that has an upper end 92A mounted to the second mounting surface 52A on the first bracket 38A and a lower end 94A mounted to the sixth mounting surface 76A located on the forward portion 70A of the first beam 60A. A second lift air bag 90B has an upper end 92B mounted to the fourth mounting surface 52B on the second bracket 38B and a lower end 94B mounted to the eighth mounting surface 76B located on the forward portion 70B of the second beam 60B.

In the exemplary suspension assembly 10, particularly for independent wheel systems, load air bags 84 and lift air bags 90 serve different purposes and operate in distinct positions in response to wheel movements. The load air bags 84A, 84B, also known as "helper" or "support" air bags, are primarily designed to support the weight of the vehicle or trailer and its cargo. They are responsible for maintaining proper ride height and load distribution, especially when the vehicle is carrying a load. During the jounce position, which occurs when the wheel moves upward (e.g., when driving over a bump or pothole), the load air bag compresses. It absorbs the energy from the upward motion of the wheel, helping to cushion the impact and maintain the ride height by supporting the added weight. In the rebound position, when the wheel moves downward after encountering an obstacle, the load air bag expands or extends to or beyond its original position. It counteracts the effects of gravity, preventing the vehicle from sagging excessively and ensuring a stable and level ride.

Lift air bags 90A, 90B, on the other hand, are primarily used to adjust the ride height or provide additional ground clearance when needed, such as load-leveling applications or wheel lifting movements. They are often used to lift or lower the wheel. During jounce, when the wheel moves upward, the lift air bag can expand or extend to raise the wheel height. In the rebound position, when the wheel moves downward, the lift air bag may deflate or contract to lower the wheel height. This can be useful for maintaining stability during high-speed or highway driving or when lowering the vehicle for loading and unloading.

Figure 3:
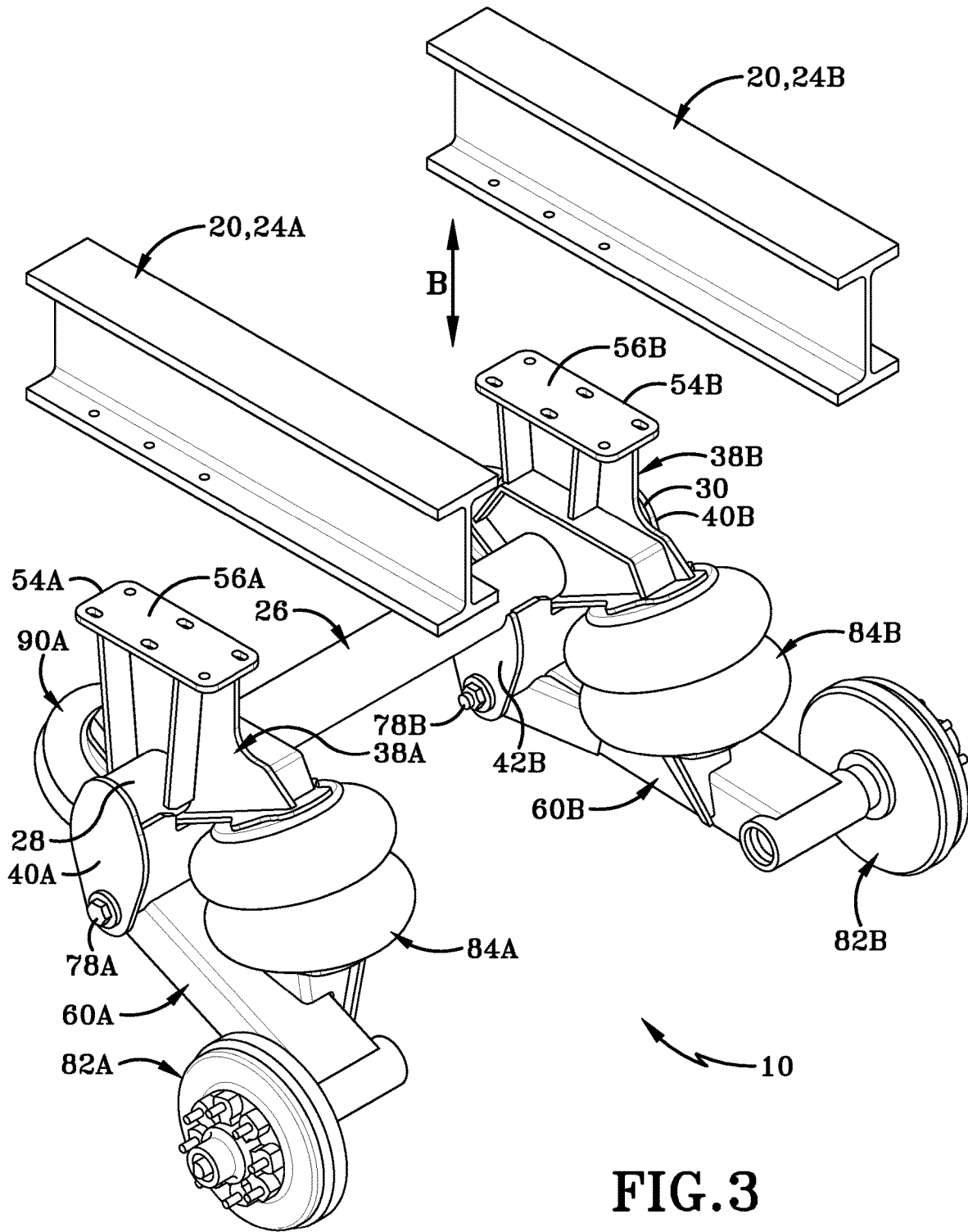
FIG. 3 is a top, rear, first side isometric view of the suspension assembly exploded from the trailer frame that represents a position of the suspension system prior to installation on the trailer frame.

With continued reference to FIG. 2 and FIG. 3, suspension assembly 10 is mounted to the rails 24A, 24B of trailer frame 20. It is envisioned that suspension assembly 10 will be shipped as a singular unit as show in FIG. 3, which then allows a customer to install the suspension assembly directly onto the frame at rails 24A, 24B. The installation of the suspension assembly 10 is shown in FIG. 3 in which the suspension assembly 10 is positioned below the lower surface of rails 24A, 24B. The plate 54A and plate 54B may be aligned such that apertures formed in the respective plates align with apertures formed in the rails 24A, 24B. Then, the user may raise the suspension assembly 10 upwardly as indicated by arrow B to establish direct contact of the surface 56A and surface 56B, with the downwardly facing surface of rails 24A, 24B. Then, connectors, such as bolts 96 may be utilized to connect the suspension assembly 10 to the rails 24A, 24B of trailer frame 20. In one particular embodiment, the diameter of the apertures formed in the plates 54A, 54B may have a diameter of approximately 0.69 inches, however it is to be understood that this diameter can be any size that is suitable for the application specific need of connecting the suspension assembly 10 to the trailer frame 20. Further, while six apertures are shown in the plates 54A, 54B it is entirely possible for the plates to have a differing amount of apertures that correspond to respective apertures or holes in the frame 20.

In one particular embodiment, the distance between the center of plate 54A and center of plate 54B measured in the transverse direction is in a range from about 40 inches to about 50 inches. In one particular embodiment, the distance between the center of plates 54A, 54B is about 42.38 inches. A vertical dimension is measured from the top surface 56A of plate 54A to the pivot axis 58. In one particular embodiment, this dimension from the pivot axis 58 to the top surface 56A of plate 54A may be in a range from about 10 inches to about 20 inches. In one particular embodiment, this vertical dimension is 15.33 inches. However, it is to be understood that the designer of suspension assembly 10 may selectively choose this vertical dimension within this range depending on the application specific needs of suspension assembly 10 as well as the desired height relative to ground 18 that is required. A dimension is established as a length measured in the longitudinal direction between the pivot axis 58 and the stub axle axis 98. Notably, the auxiliary wheel 12 will rotate about the axis 98. The dimension between the pivot axis 58 and the axis 98 is in a range from about 15 inches to about 20 inches. In one particular embodiment, the dimension between the pivot axis 58 and the wheel axis for stub axle axis 98 is 18.75 inches. Notably, the axis 98 is located rearward of the pivot axis 58 relative to the forward direction of travel of trailer 14. Thus, the beams 60A, 60B establish the suspension assembly 10 to be a type of trailing arm suspension assembly.

Referring back to FIG. 4A, in one embodiment, the mount 48A includes a flange 100A that extends downwardly from the lower surface of plate 54A toward the top portion 34 of the cross member 26. Flange 100A includes an outwardly facing surface and an inwardly facing surface that faces the flange 100B on the second side of suspension assembly 10. One or more support members 102A may be positioned on the interior and exterior sides of flange 100A and extend between the lower surface of plate 54A and the top portion 34 of the cross member 26. On the interior side of flange 100A is a longitudinally aligned plate 106A that has a forward end 108A and a rear end 110A. The ends 108A and 110A extend downwardly at an angle and are in contact with the upwardly facing surfaces of mounting surface 50A and mounting surface 52A, respectively.

Flange 107B is shown as being positioned below the longitudinally aligned plate 106B. Flange 107B extends downward from the lower surface of the longitudinally aligned plate 106B to the top portion 34 of the cross member 26. Although the corresponding flange cannot be seen in this view of FIG. 4A, it is present on the first side of the assembly 10 and would be denoted as flange 107A if it were visible in FIG. 4A.

Figure 4A:
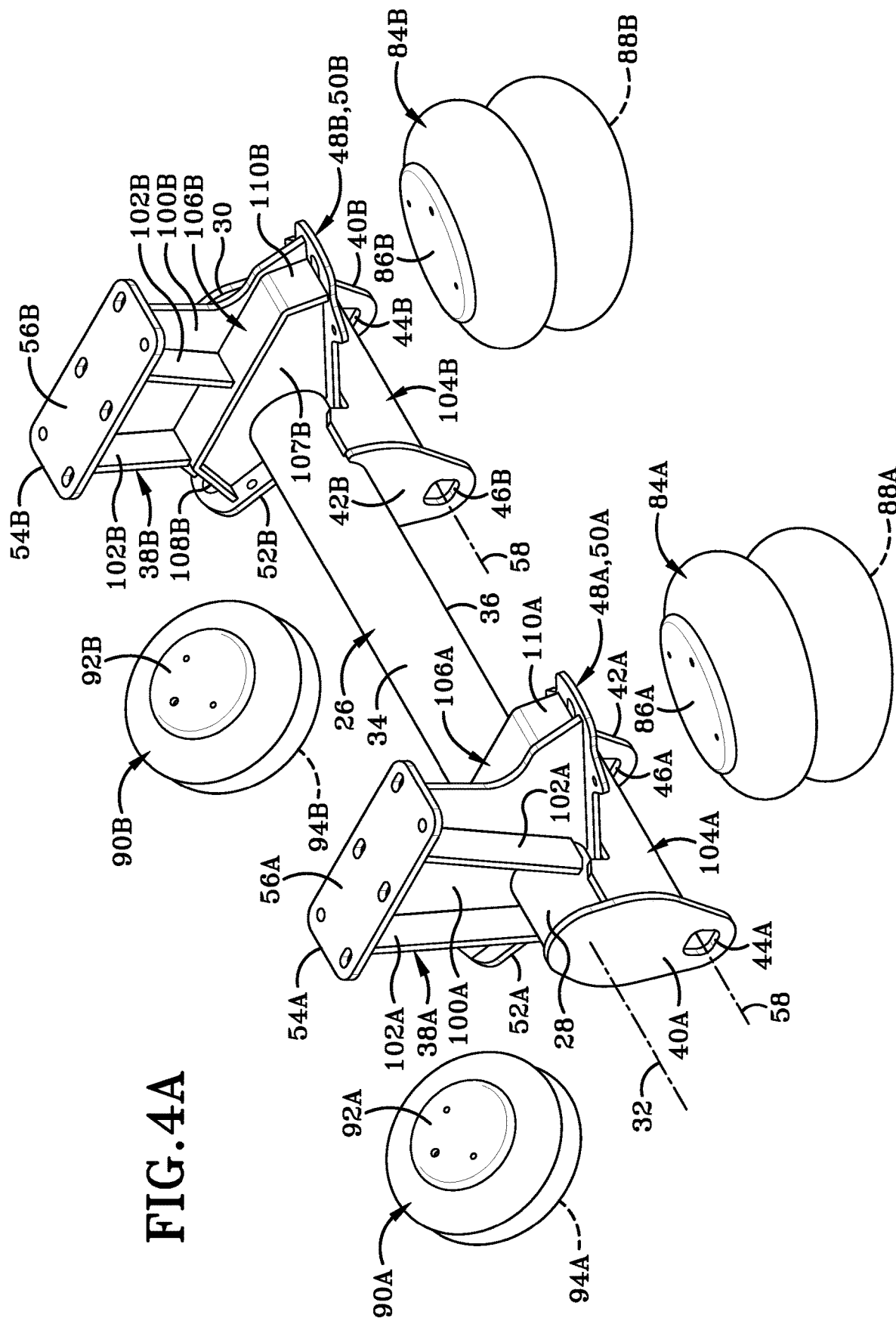
FIG. 4A (FIG. 4A) is a top, rear, first side isometric and exploded view of the load air bags, the lift airbags, the cross member or support and the mounts.
Figure 7B:
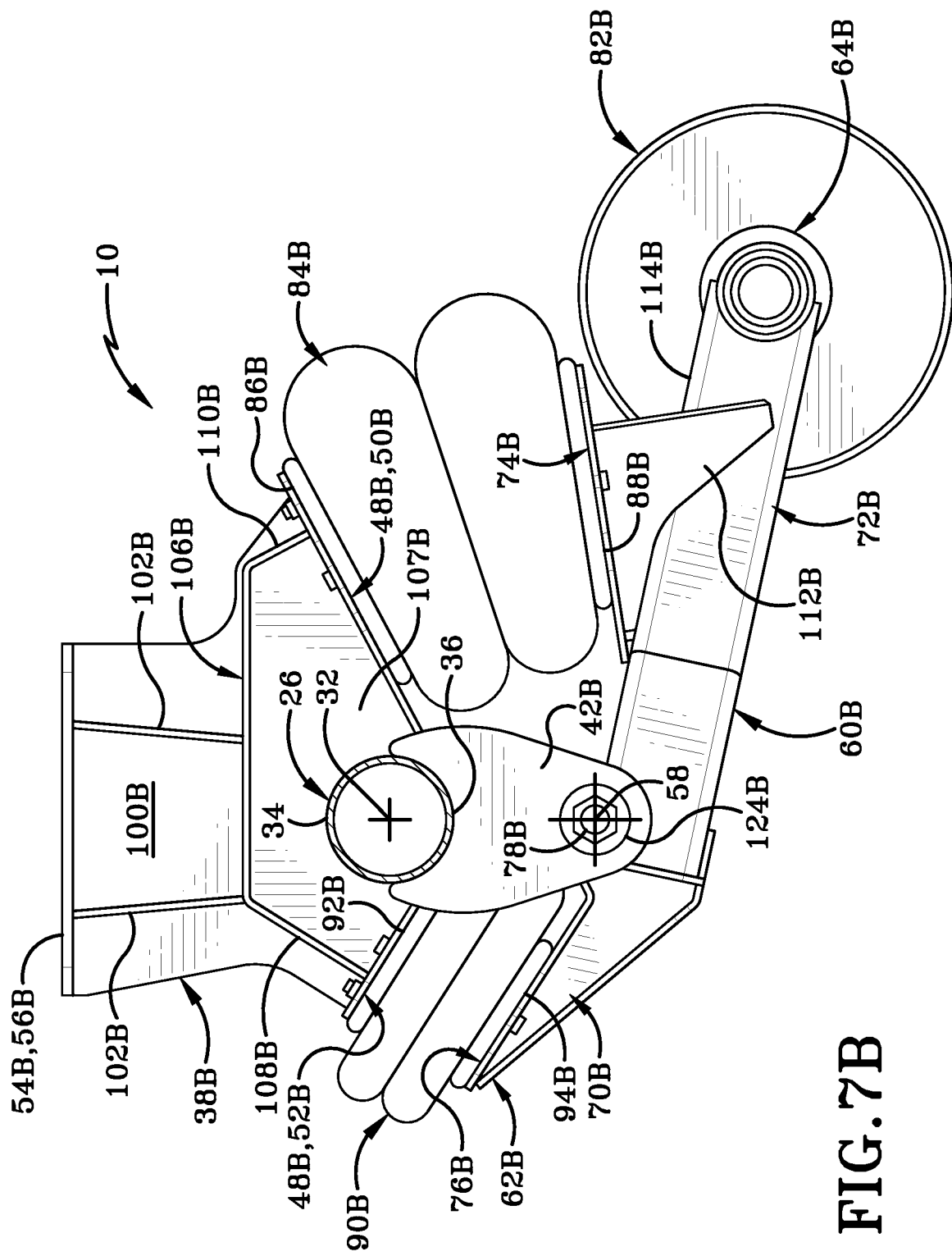
FIG. 7B is an elevation cross-section view of the suspension assembly taken along line 7B-7B in FIG. 6.

FIG. 4A and FIG. 7 depict that there is an L-shaped plate and accompanying vertical gusset (FIG. 7A). The L-shaped plate 104A and the vertical gusset are positioned between plate 40A and plate 42A. The L-shaped plate 104B and the vertical gusset are positioned between plate 40B and plate 42B.

Figure 5:
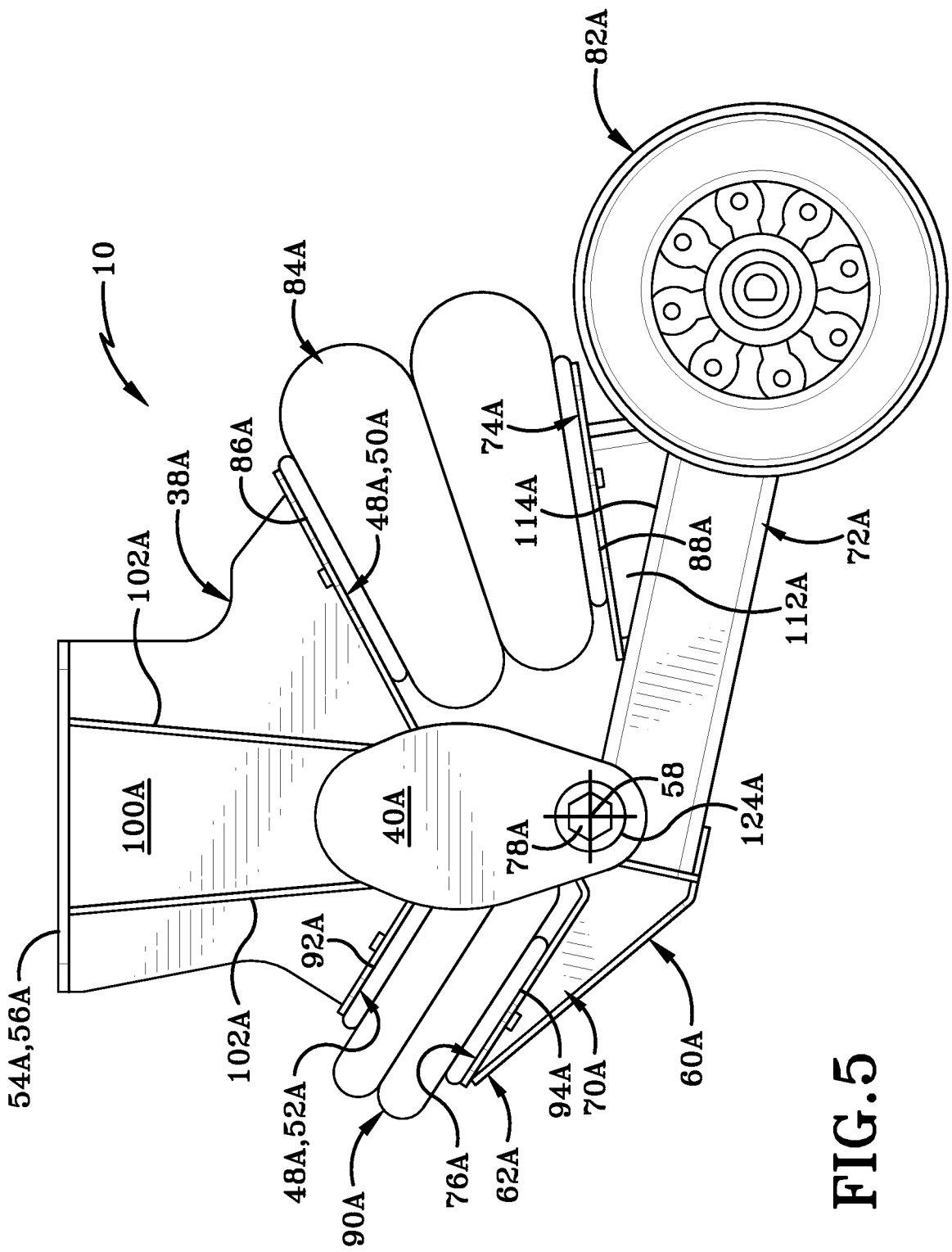
FIG. 5 (FIG. 5) is a side elevation view of the suspension assembly.

FIG. 5 depicts a side elevation view of the suspension assembly 10 in which it is seen that the configuration of the beam 60A and airbags 84A, 90A have a seesaw or teeter-totter configuration in which the rear portion 72A of beam 60A and the forward portion 70A of the beam 60A pivot about the pivot axis 58 acting as a fulcrum. The respective forward and rear portions 70A, 72A act as lever arms that extend forwardly and rearward from the pivot axis 58, respectively. Thus, when one end of the beam 60A goes up, the other end of the beam 60A goes down.

Figure 8A:
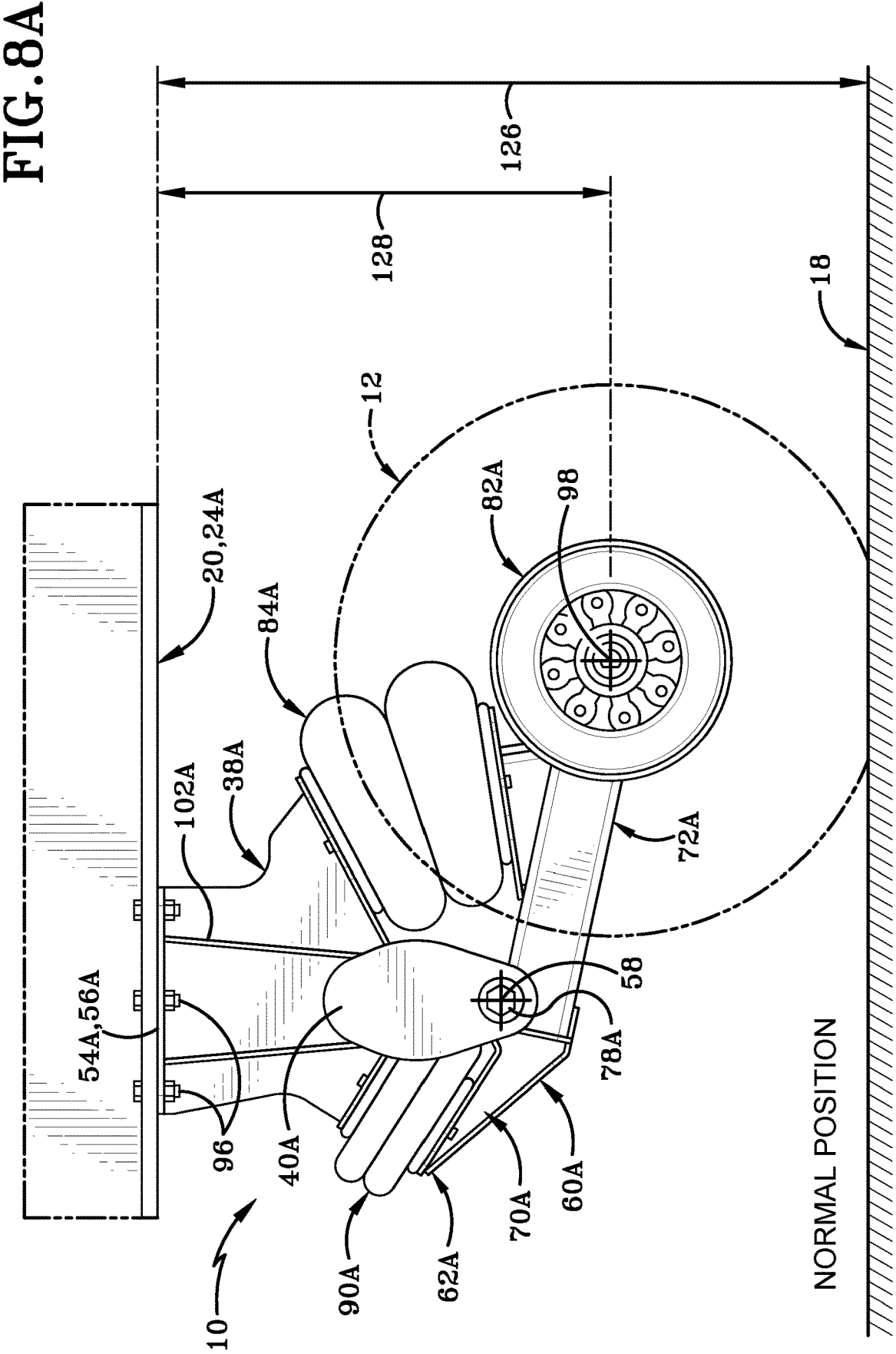
FIG. 8A is a side elevation operational view of the suspension assembly in its normal or home position.

FIG. 8A depicts the normal position of the auxiliary wheel 12 on the suspension assembly 10. In the normal position, the auxiliary wheel 12 engages the ground 18. When the auxiliary wheel 12 is connected to brake assembly 82A, a vertical dimension is established between the top surface 56A of plate 54A to the ground 18. The dimension 126 measured from ground 18 to the top surface 56A of plate 54A is in a range from about 30 inches to about 40 inches. In one particular embodiment, the dimension 126 is 35.5 inches. In another particular embodiment the vertical dimension 126 is about 39 inches. In this normal position, a vertical dimension 128 is established between the top surface 56A of plate 54A to the axis 98 associated with the stub axle of the brake assembly 82A. In the normal position, the forward end 62A of the first beam 60A is located at a greater vertical height than the pivot axis 58, which is due to the upward inclination of the forward portion 70A relative to the rear portion 72A.

FIG. 8B depicts the lifted or jounce position of assembly 10. When the auxiliary wheel 12 is lifted or jounced, the forward portion 70A of beam 60A pivots about the pivot axis 58 as indicated by arrow C. The pivoting action about axis 58, as indicated by arrow C, causes the dimension 128 to decrease and establishes a jounce dimension 130. The jounce dimension is the vertical amount of travel that the axis 98 travels from its home position to the lifted or jounce position. In one particular embodiment, the jounce dimension 130 is in a range from about 6 inches to about 12 inches. In one particular embodiment, the jounce dimension 130 is 10.25 inches. In another embodiment, the lift or jounce dimension 130 is about 8 inches. As the auxiliary wheel 12 is moved from the normal position to the lifted or jounce position, the rear portion 72A of beam 60A is lifted upwardly and rotates about pivot axis 58 as indicated by arrow D. In the jounce position, the forward end 62A of the first beam 60A is located at a vertical height that approximates the vertical position of the pivot axis 58, which is due to the upward inclination of the forward portion 70A relative to the rear portion 72A.

FIG. 8C depicts the rebound position of suspension assembly 10. The rebound position extends the auxiliary wheel 12 downward to lengthen the vertical dimension 128. A rebound dimension 132 is established when the wheel and rear portion 72A of beam 60A rotate about the pivot axis 58 in the direction of arrow E. During the rebound, the forward portion 70A of beam 60A rotates about the pivot axis as indicated by arrow F. In the rebound position, the forward end 62A of the first beam 60A is located at a greater vertical height than the pivot axis 58 (and at a greater vertical height of the forward end 62A in the normal position of FIG. 8A), which is due to the upward inclination of the forward portion 70A relative to the rear portion 72A.

With continued reference to FIG. 8A-8C, it is to be clearly understood that each side of the suspension assembly operates independently from the other side. Stated otherwise, when one wheel is in one of the three positions, the other wheel may be in any of the other three positions. For example, when one wheel (e.g., a left auxiliary wheel 12) is in the jounce position, the other wheel (e.g., a right auxiliary wheel 12) may be in any of the rebound position, the normal position, or the jounce position. When one wheel (e.g., a left auxiliary wheel 12) is in the normal position, the other wheel (e.g., a right auxiliary wheel 12) may be in any of the rebound position, the normal position, or the jounce position. When one wheel (e.g., a left auxiliary wheel 12) is in the rebound position, the other wheel (e.g., a right auxiliary wheel 12) may be in any of the rebound position, the normal position, or the jounce position. The independent wheels enable each of them to travel without torquing or bending a complete axle that would normally connect both trailing suspension beams side-to-side.

When the suspension assembly 10 is moved from its normal position to the lifted or jounce position, the load airbag 84A contracts and the lift airbag 90A expands. When in the rebound position the load airbag 84A expands beyond its normal positioning and the lift airbag 90A contracts. Together the cooperation of the airbags 84A and 90A effectuate the seesaw arrangement or teeter-totter arrangement of the beam 60A relative to bracket 30A.

Taken together, the total vertical dimension of travel of the suspension assembly is about 13 inches when summing the jounce dimension 130 and rebound dimension 132. In one particular embodiment, the rebound dimension is in a range from about 2 inches to about 5 inches. In one particular embodiment, the rebound dimension 132 is 2.75 inches. Thus, when taking the particular embodiments of a rebound dimension of 2.75 inches and a jounce dimension 130 of 10.25 inches, then the total travel distance of the axis 98 between the full rebound position and the full jounce position is 13 inches.

With respect to the installation of assembly 10 on the trailer 14, one advantage of the construction of assembly 10 is that assembly 10 may be shipped or otherwise provided to the end-user or customer as a single unit (less wheel 12). Thus, an assembly 10 can be fully fabricated by the manufacturer and sent directly to the customer (or through a distributor). This enables the customer to simply install the assembly 10 by attaching it to frame 20 and installing the auxiliary wheels 12.

To install the assembly 10, the user will receive the assembled suspension assembly 10 from a supplier, such as the manufacturer of assembly 10. Then, the user will place the assembly 10 beneath the frame. The top surface 56A of plate 54A is aligned with the underside of rail 24A on frame 20. The top surface 56B of plate 54B is aligned with the underside of rail 24B on frame 20. Assembly 10 is raised or lifted in the vertical direction. Then, bolts 96 are used to connect plate 54A to rail 24A and to connect plate 54B to rail 24B. Alternatively, the plates 54A, 54B can be welded to rails 24A, 24B, respectively. By having the assembly 10 fully fabricated and utilizing the cross member 26 and brackets 38A, 38B, assembly 10 can be shipped as a single unit with toe and camber set at the manufacturer's factory. Thus, once assembly 10 is installed on trailer 14, the assembly 10 and trailer are immediately ready for operation upon installation of the auxiliary wheel 12 and connection of air source lines or pneumatic lines. No further alignment adjustments would be required.

As briefly discussed previously, in one exemplary embodiment, the first bracket 38A is integrally formed with the cross support member 26 and located proximate the first end of the cross support member 26 and the second bracket 38B is integrally formed with the cross support member 26 and located proximate the second end of the cross support member. Integrally forming the first and second brackets 38A, 38B with the cross support member 26 in the air suspension assembly 10 for the auxiliary wheel on the trailer offers several benefits and advantages, especially when considering the task of carrying a vertical load or another load.

Integrally forming the first and second brackets 38A, 38B with the cross support member 26 significantly contributes to the overall structural integrity of the air suspension assembly 10. In a traditional design with separate components, such as brackets attached to the cross support member (e.g., not integrally formed, such as being connected with bolts as opposed to being integrally formed), there may be inherent weaknesses at the connection points. These connections could be potential stress concentration areas, leading to fatigue and failure over time, especially under heavy vertical loads or repeated stress cycles during movement of the beams or the trailer itself.

By integrating the brackets 38A, 38B directly into the cross support member 26 during the manufacturing process, this embodiment of assembly 10 eliminates the need for additional fasteners, or other connecting methods. This seamless integration minimizes weak points, reducing the risk of structural failure. The continuous material flow from the cross support member 26 to the brackets 38A, 38B ensures a more uniform distribution of stresses, enhancing the assembly's ability to withstand varying loads and environmental conditions.

The absence of separate attachment points also reduces the likelihood of corrosion, fatigue, or wear occurring at joints. Corrosion, for example, is a common issue in metal structures, and integrated components help mitigate this risk by providing a more homogeneous, uniform structure that is less susceptible to environmental factors.

Moreover, the integral design enhances the overall stiffness of the assembly 10. Structural stiffness is beneficial for maintaining the structural integrity and preventing excessive deflection or deformation of assembly 10 when subjected to vertical loads or rotational loads. The continuous material of the integrated structure of assembly 10 ensures that forces are distributed efficiently, reducing the risk of localized stress concentrations that could compromise the assembly's performance. Further, fewer parts mean fewer potential points of failure, reducing the likelihood of issues arising during operation or under heavy loads.

The integration of the first bracket 38A and second bracket 38B directly into the cross support member 26 leads to a more streamlined and simplified design. In traditional assemblies with separate connected components, additional fasteners or connecting elements would be necessary to attach brackets to the support member. Each added component contributes to the overall weight and complexity of the assembly. By eliminating the need for separate brackets and attachment methods, the integral design of the present disclosure reduces the number of parts involved in the assembly 10. This reduction in components not only simplifies the manufacturing process but also results in a lighter overall structure. In applications such as trailer design, where weight is an important factor for fuel efficiency and load capacity, minimizing the weight of auxiliary components becomes advantageous.

The weight reduction achieved through the integral design has implications for the overall efficiency of the trailer. A lighter suspension assembly 10 means less mass to be supported and moved, leading to potential fuel savings and improved towing performance. Additionally, it can contribute to compliance with weight regulations in transportation, ensuring that the trailer remains within legal weight limits.

Rigidity is also a factor in the performance of a suspension assembly, especially when it comes to carrying vertical loads or rotational loads on a trailer. Rigidity refers to the resistance of the structure to deformation or flexing under applied loads, and it is beneficial for maintaining stability and structural integrity. The integral formation of the first and second brackets 38A, 38B with the cross support member 26 creates a continuous and unbroken structure. This continuity enhances the rigidity of the entire assembly 10 by providing a direct load path through the integrated components. In contrast, separate brackets connected to the cross support member might introduce joints or connections that could potentially introduce flex points or areas of weakness.

Rigidity is particularly important when dealing with vertical loads, as any excessive flexing or deformation could lead to instability, reduced load-bearing capacity, or even structural failure. The integral design ensures that the load is distributed uniformly across the entire structure, minimizing the risk of localized stress concentrations that could compromise rigidity.

Additionally, the teeter-totter configuration of the first and second beams relative to their respective brackets 38A, 38B allows for controlled movement, contributing to the overall flexibility of the assembly 10 without sacrificing rigidity. This controlled movement helps absorb shocks and vibrations generated during travel, enhancing the comfort and stability of the trailer.

The enhanced rigidity resulting from the integral design not only improves the structural performance but also contributes to better handling and maneuverability of the trailer. A rigid suspension system assembly 10 ensures that the trailer maintains its intended orientation and stability, especially when navigating uneven terrain or encountering dynamic loads during transportation.

Furthermore, the integral design minimizes the risk of fatigue failure, as continuous structures are generally more resistant to cyclic loading than structures with discrete connections. This is particularly relevant in applications where the suspension assembly is subjected to repeated movements between the normal position to the jounce position or the rebound position.

Still further, the integral formation or welding of the first and second brackets 38A, 38B with the cross support member 26 contributes significantly to the effective distribution of vertical loads across the entire structure. In traditional designs with separate brackets, there may be discontinuities or stress concentrations at the connection points between the brackets and the support member. These discontinuities can result in uneven load distribution and increase the risk of structural failure. By integrating or welding the brackets 38A, 38B directly into the cross support member 26, the design ensures a more uniform transmission of loads. The load is distributed seamlessly or evenly along the continuous material flow, reducing the likelihood of localized stress concentrations. This uniform load distribution is beneficial for preventing premature wear, fatigue, and deformation of the components, especially when the assembly is subjected to heavy vertical loads. The integral or welded design also minimizes the potential for torsional forces that could occur with separate brackets. Torsional forces can introduce twisting motions in the structure, leading to instability and reduced load-bearing capacity. The continuous material flow in the integrated design helps counteract these torsional forces, providing a more stable and predictable load distribution. Uniform load distribution is beneficial for maintaining balance and stability in the trailer during transportation. It helps provide that the auxiliary wheel and suspension assembly respond uniformly to changes in load, preventing issues such as uneven tire wear, trailer swaying, or difficulties in steering.

The teeter-totter configuration of the first and second beams relative to their respective brackets, with independent pivoting, should achieve effective load transfer within the air suspension assembly. In the teeter-totter or rocking configuration, each beam can pivot independently about the pivot axis 58, allowing for a dynamic response to varying loads and road conditions. This design enables the suspension assembly 10 to adapt to uneven terrain, absorb shocks, and maintain optimal contact between the auxiliary wheel and the road surface. The independent pivoting of the beams should ensure that each beam responds individually to changes in load or road conditions. This adaptability is particularly valuable in situations where one side of the trailer may experience different forces than the other, such as when navigating uneven terrain or encountering obstacles. The teeter-totter motion allows the beams to transfer the vertical loads from the brackets to the cross support member in a controlled and efficient manner. As one beam pivots, the load is transferred to the other beam, helping to evenly distribute forces and prevent localized stress concentrations. The dynamic load transfer also contributes to improved stability and traction. By allowing the beams to pivot independently, the suspension assembly can better conform to changes in the road surface, ensuring consistent contact between the auxiliary wheel and the ground. This, in turn, enhances the overall handling and performance of the trailer, especially in challenging driving conditions. Furthermore, the teeter-totter configuration provides a degree of isolation between the two beams. This isolation helps prevent the transmission of excessive vibrations or shocks from one side of the assembly to the other, contributing to a smoother and more comfortable ride for both the trailer and its cargo.

While not in the figures, the suspension assembly 10 of the present disclosure may additionally include one or more sensors to sense or gather data pertaining to the surrounding environment or operation of the device, assembly, or system. Some exemplary sensors capable of being electronically coupled with the device, assembly, or system of the present disclosure (either directly connected to the device, assembly, or system of the present disclosure or remotely connected thereto) may include but are not limited to: accelerometers sensing accelerations experienced during rotation, translation, velocity/speed, location traveled, elevation gained; gyroscopes sensing movements during angular orientation and/or rotation, and rotation; altimeters sensing barometric pressure, altitude change, terrain climbed, local pressure changes, submersion in liquid; impellers measuring the amount of fluid passing thereby; Global Positioning sensors sensing location, elevation, distance traveled, velocity/speed; audio sensors sensing local environmental sound levels, or voice detection; Photo/Light sensors sensing ambient light intensity, ambient, Day/night, UV exposure; TV/IR sensors sensing light wavelength; Temperature sensors sensing internal or external temperature, ambient air temperature, and environmental temperature; and Moisture Sensors sensing surrounding moisture levels; height sensors that measure the height of the trailer's suspension system; Load sensors are used to measure the weight being carried by the trailer; Pressure Sensors that monitor the air pressure in the suspension system or air bags 84 or 90; Position sensors, such as potentiometers or encoders, can be used to determine the position of the suspension components; Vibration sensors can detect excessive vibrations in the suspension system, and this data can be used to adjust the damping characteristics of the suspension to enhance ride comfort.

If sensors are utilized to gather data relating to the assembly 10 of the present disclosure, then sensed data may be evaluated and processed with artificial intelligence (AI) in an Electronic Control Unit (ECU) for processing data from various sensors and controlling the overall performance of the suspension system assembly 10. It can make real-time adjustments based on the sensor inputs to optimize the trailer's ride and handling characteristics. Analyzing data gathered from sensors using artificial intelligence involves the process of extracting meaningful insights and patterns from raw sensor data to produce refined and actionable results. Raw data is gathered from various sensors, for example those which have been identified herein or others, capturing relevant information based on the intended analysis. This data is then preprocessed to clean, organize, and structure it for effective analysis. Features that represent key characteristics or attributes of the data are extracted. These features serve as inputs for AI algorithms, encapsulating relevant information essential for the analysis. A suitable AI model, such as machine learning or deep learning (regardless of whether it is supervised or unsupervised), is chosen based on the nature of the data and the desired analysis outcome. The model is then trained using labeled or unlabeled data to learn the underlying patterns and relationships. The model is fine-tuned and optimized to enhance its performance and accuracy. This process involves adjusting parameters, architectures, and algorithms to achieve better results. The trained model is used to make predictions or inferences on new, unseen data. The model processes the extracted features and generates refined output based on the patterns it has learned during training. The results produced by the AI model are refined through post-processing techniques to ensure accuracy and relevance. These refined results are then interpreted to extract meaningful insights and derive actionable conclusions. Feedback from the refined results is used to improve the AI model iteratively. The process involves incorporating new data, adjusting the model, and enhancing the analysis based on real-world feedback and evolving requirements.

The device, assembly, or system of the present disclosure may include wireless communication logic coupled to sensors on the device, assembly, or system. The sensors gather data and provide the data to the wireless communication logic. Then, the wireless communication logic may transmit the data gathered from the sensors to a remote device. Thus, the wireless communication logic may be part of a broader communication system, in which one or several devices, assemblies 10, or systems of the present disclosure may be networked together to report alerts and, more generally, to be accessed and controlled remotely. Depending on the types of transceivers installed in the device, assembly, or system of the present disclosure, the system may use a variety of protocols (e.g., Wi-Fi®, ZigBee®, MIWI, BLUETOOTH®) for communication. In one example, each of the devices, assemblies, or systems of the present disclosure may have its own IP address and may communicate directly with a router or gateway. This would typically be the case if the communication protocol is Wi-Fi®. (Wi-Fi® is a registered trademark of Wi-Fi Alliance of Austin, TX, USA; ZigBee® is a registered trademark of ZigBee Alliance of Davis, CA, USA; and BLUETOOTH® is a registered trademark of Bluetooth Sig, Inc. of Kirkland, WA, USA).

The system that receives and processes signals from the suspension assembly 10 of the present disclosure may differ from embodiment to embodiment. In one embodiment, alerts and signals from the suspension assembly 10 of the present disclosure are sent through an e-mail or simple message service (SMS; text message) gateway so that they can be sent as e-mails or SMS text messages to a remote device, such as a smartphone, laptop, or tablet computer, monitored by a responsible individual, group of individuals, or department, such as a maintenance department. Thus, if a particular suspension assembly 10 of the present disclosure creates an alert because of a data point gathered by one or more sensors, that alert can be sent, in e-mail or SMS form, directly to the individual responsible for fixing it. Of course, e-mail and SMS are only two examples of communication methods that may be used; in other embodiments, different forms of communication may be used.

In other embodiments, alerts and other data from the sensors on the suspension assembly 10 of the present disclosure may also be sent to a work tracking system that allows the individual, or the organization for which he or she works, to track the status of the various alerts that are received, to schedule particular workers to repair a particular suspension assembly 10 of the present disclosure, and to track the status of those repair jobs. A work tracking system would typically be a server, such as a Web server, which provides an interface individuals and organizations can use, typically through the communication network. In addition to its work tracking functions, the work tracker may allow broader data logging and analysis functions. For example, operational data may be calculated from the data collected by the sensors on the suspension assembly 10 of the present disclosure, and the system may be able to provide aggregate suspension operational data for a suspension assembly 10 of the present disclosure or group of suspension assemblies of the present disclosure.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, the pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Unless explicitly stated that a particular shape or configuration of a component is mandatory, any of the elements, components, or structures discussed herein may take the form of any shape. Thus, although the figures depict the various elements, components, or structures of the present disclosure according to one or more exemplary embodiments, it is to be understood that any other geometric configuration of that element, component, or structure is entirely possible. For example, instead of the one of the components of suspension assembly 10 being described in manner orientation that component could be semi-circular triangular, rectangular or square, pentagonal, hexagonal, heptagonal, octagonal, decagonal, dodecagonal, diamond shaped or another parallelogram, trapezoidal, star-shaped, oval, ovoid, lines or lined, teardrop-shaped, cross-shaped, donut-shaped, heart-shaped, arrow-shaped, crescent-shaped, any letter shape (i.e., A-shaped, B-shaped, C-shaped, D-shaped, E-shaped, F-shaped, G-shaped, H-shaped, I-shaped, J-shaped, K-shaped, L-shaped, M-shaped, N-shaped, O-shaped, P-shaped, Q-shaped, R-shaped, S-shaped, T-shaped, U-shaped, V-shaped, W-shaped, X-shaped, Y-shaped, or Z-shaped), or any other type of regular or irregular, symmetrical or asymmetrical configuration unless explicitly stated that a particular shape or configuration of the component is mandatory.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

From the viewpoint of the manufacturer of assembly 10, a method corresponding to assembly 10 may include assembling an air suspension assembly to create an assembled air suspension assembly, the assembled suspension assembly comprising a cross support member that is adapted to mount transversely between opposing rails of a trailer, a first bracket integrated to the cross support member, a first beam pivotably coupled to the first bracket, wherein the first beam pivots about a pivot axis located between a forward end and a rear end of the first beam defining a teeter-totter configuration of the first beam relative to the first bracket, a first load air bag located rearward of the pivot axis, and the first load air bag positioned between the first beam and the first bracket, and a first lift air bag located forward of the pivot axis, and the first lift air bag positioned between the first beam and the first bracket. This method may then include providing the assembled air suspension assembly to a customer. Then, effecting the customer to install the assembled air suspension assembly on a trailer. Then, effecting the customer to couple an auxiliary wheel to the air suspension assembly without adjusting wheel toe, wheel camber, or caster angle.

From the viewpoint of the customer that has purchased assembly 10, a method corresponding to the assembly 10 may include receiving an assembled air suspension assembly, the assembled air suspension assembly comprising a cross support member that is adapted to mount transversely between opposing rails of a trailer, a first bracket integrated to the cross support member, a first beam pivotably coupled to the first bracket, wherein the first beam pivots about a pivot axis located between a forward end and a rear end of the first beam defining a teeter-totter configuration of the first beam relative to the first bracket, a first load air bag located rearward of the pivot axis, and the first load air bag positioned between the first beam and the first bracket, and a first lift air bag located forward of the pivot axis, and the first lift air bag positioned between the first beam and the first bracket. Then, installing the assembled air suspension assembly on a trailer. Then, coupling an auxiliary wheel to the air suspension assembly without adjusting wheel toe, wheel camber, or caster angle.

The advantage of not having to adjust wheel toe, wheel camber, or caster angle when installing the air suspension assembly on a trailer lies in the simplicity and ease of the installation process. This results in a simplified installation process. The manufacturer benefits from a suspension assembly 10 that simplifies the assembly and installation process. By eliminating the need for adjustments to wheel toe, wheel camber, or caster angle during installation, the assembly becomes more straightforward, reducing the complexity of manufacturing and assembly processes. The customer benefits from a suspension assembly 10 that is easy to install without requiring specialized tools or expertise because it is fully assembled when they receive it. This can lead to a quicker and more efficient installation process, reducing labor costs and the potential for errors during installation.

This also results in time and cost savings. For the manufacturer, simplifying the installation process of assembly 10 can lead to increased efficiency on the production line. The reduced need for adjustments means less time spent on fine-tuning each assembly, allowing the manufacturer to produce and deliver products more quickly and at a potentially lower cost. Additionally, the customer benefits from time and cost savings associated with the installation of the air suspension assembly 10. Without the need for complex adjustments, the installation process is faster, and there is a decreased likelihood of errors that could result in additional costs for adjustments or corrections.

This also results in user-friendly installation. For the manufacturer, the assembly 10 minimizes the need for adjustments and makes the product more user-friendly and appealing to a broader customer base. Manufacturers can market their products as easy to install, attracting customers who may not have extensive technical knowledge. Additionally, customers appreciate products that are easy to install without requiring specialized skills or tools. This user-friendly design enhances customer satisfaction and may encourage repeat business or positive referrals.

This should also result in consistent performance. For the Manufacturer, a suspension assembly 10 that does not require adjustments during installation helps ensure consistency in the performance of the air suspension assembly 10. This can lead to fewer variations in product quality and functionality. Additionally, consistent performance translates to a reliable and predictable experience for the customer. Without the need for adjustments, the suspension system is more likely to perform as intended, contributing to overall satisfaction and reducing the need for follow-up adjustments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

As used herein, "integrally formed" or "integral formation" and the like refers to a permanent or substantially-permanent connection that allows for stresses or loads to be transferred between the connected components that are referred to as being integrally formed together. The integral formation can be accomplished by a variety of different manufacturing techniques, including but not limited to, welding two components together in a permanent or substantially-permanent manner, casting the components together, molding the components together, or securing the components in a different permanent or substantially-permanent manner. For example, the first bracket and the second bracket (or their respective constituent components) can be welded to the cross support member to establish an integrally formed relationship.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A method comprising:
 assembling a lift axle air suspension assembly to create an assembled lift axle air suspension assembly, the assembled lift axle air suspension assembly comprising a cross support member that is adapted to mount transversely on opposing rails of a trailer, a first bracket integrated to the cross support member, a first beam pivotably coupled to the first bracket, wherein the first beam pivots about a pivot axis located between a forward end and a rear end of the first beam defining a teeter-totter configuration of the first beam relative to the first bracket, a first load air bag located rearward of the pivot axis, and the first load air bag positioned between the first beam and the first bracket, and a first lift air bag located forward of the pivot axis, and the first lift air bag positioned between the first beam and the first bracket;
providing the assembled lift axle air suspension assembly to a customer;
providing resources to the customer detailing how to install the assembled lift axle air suspension assembly on a trailer; and
providing resources to the customer detailing how to couple an auxiliary wheel to the lift axle air suspension without adjusting wheel toe, wheel camber, or caster angle.

2. The method of claim 1, wherein providing resources to the customer detailing how to install the assembled lift axle air suspension assembly on a trailer is accomplished by providing resources to the customer detailing how to bolt the assembled lift axle air suspension assembly to an underside of a frame rail on the trailer.

3. The method of claim 1, wherein providing resources to the customer detailing how to install the assembled lift axle air suspension assembly on a trailer is accomplished by providing resources to the customer detailing how to install the assembled lift axle air suspension assembly forwardly of a set of primary rear wheels, wherein the primary rear wheels are adapted to continuously engage the ground.

4. The method of claim 1, further comprising:
providing resources to the customer detailing how to move the first beam from a normal position to a jounce position, wherein movement of the first beam to the jounce position is accomplished by pivoting the first beam about the pivot axis, compressing the first load air bag, and extending the first lift air bag.

5. The method of claim 1, further comprising:
providing resources to the customer detailing how to move the first beam from a normal position to a rebound position, wherein movement of the first beam to the rebound position is accomplished by pivoting the first beam about the pivot axis, extending the first load air bag, and compressing the first lift air bag.

6. The method of claim 1, further comprising:
providing resources to the customer detailing how to move the forward end of the first beam between at least three different vertical heights that correspond to a normal position, a jounce position, and a rebound position.

7. The method of claim 1, further comprising:
providing resources to the customer detailing how to move a forward end of a second beam independently of movement of the first beam, wherein the second beam is positioned on an opposite side of the assembled lift axle air suspension assembly than the first beam, wherein the second beam pivots about the pivot axis located between the forward end and a rear end of the second beam defining a teeter-totter configuration of the second beam relative to a second bracket at a second end of the cross support member, a second load air bag located rearward of the pivot axis, and the second load air bag positioned between the second beam and the second bracket, and a second lift air bag located forward of the pivot axis, and the second lift air bag positioned between the second beam and the second bracket, wherein the second beam, the second bracket, the second end of the cross support member, the second load air bag, and the second lift airbag are parts of the lift axle air suspension assembly.

8. A method comprising:
receiving an assembled lift axle air suspension assembly, the assembled lift axle air suspension assembly comprising a cross support member that is adapted to mount transversely on opposing rails of a trailer, a first bracket integrated to the cross support member, a first beam pivotably coupled to the first bracket, wherein the first beam pivots about a pivot axis located between a forward end and a rear end of the first beam defining a teeter-totter configuration of the first beam relative to the first bracket, a first load air bag located rearward of the pivot axis, and the first load air bag positioned between the first beam and the first bracket, and a first lift air bag located forward of the pivot axis, and the first lift air bag positioned between the first beam and the first bracket;
installing the assembled lift axle air suspension assembly on a trailer; and
coupling an auxiliary wheel to the assembled lift axle air suspension assembly without adjusting wheel toe, wheel camber, or caster angle.

9. The method of claim 8, wherein after installing the assembled lift axle air suspension assembly, the assembled lift axled air suspension assembly is enabled to move the first beam from a normal position to a jounce position, wherein moving the first beam to the jounce position is accomplished by pivoting the first beam about the pivot axis, compressing the first load air bag, and extending the first lift air bag.

10. The method of claim 8, wherein after installing the assembled lift axle air suspension assembly, the assembled lift axled air suspension assembly is enabled to move the first beam from a normal position to a rebound position, wherein moving the first beam to the rebound position is accomplished by pivoting the first beam about the pivot axis, extending the first load air bag, and compressing the first lift air bag.

11. The method of claim 8, wherein after installing the assembled lift axle air suspension assembly, the assembled lift axled air suspension assembly is enabled to move the forward end of the first beam between at least three different vertical heights that correspond to a normal position, a jounce position, and a rebound position.

12. The method of claim 8, wherein after installing the assembled lift axle air suspension assembly, the assembled lift axled air suspension assembly is enabled to move a forward end of a second beam of the assembled lift axle air suspension assembly independently of movement of the first beam, wherein the second beam is positioned on an opposite side of the assembled lift axle air suspension assembly than the first beam, wherein the second beam pivots about the pivot axis located between the forward end and a rear end of the second beam defining a teeter-totter configuration of the second beam relative to a second bracket at a second end of the cross support member, a second load air bag located rearward of the pivot axis, and the second load air bag positioned between the second beam and the second bracket, and a second lift air bag located forward of the pivot axis, and the second lift air bag positioned between the second beam and the second bracket, wherein the second beam, the second bracket, the second end of the cross support member, the second load air bag, and the second lift airbag are parts of the assembled lift axle air suspension assembly.

13. The method of claim 8, wherein installing the assembled lift axle air suspension assembly on a trailer is accomplished by bolting the assembled lift axle air suspension assembly to an underside of a frame rail on the trailer.

14. The method of claim 8, wherein installing the assembled lift axle air suspension assembly on a trailer is accomplished by installing the assembled lift axle air suspension assembly forwardly of a set of primary rear wheels, wherein the primary rear wheels are adapted to continuously engage the ground.

\* \* \* \* \*